(12) United States Patent
McKee et al.

(10) Patent No.: US 10,337,745 B2
(45) Date of Patent: Jul. 2, 2019

(54) CONVECTION OVEN

(71) Applicant: ALTO-SHAAM, INC., Menomonee Falls, WI (US)

(72) Inventors: Philip R. McKee, Frisco, TX (US); Lee Thomas VanLanen, McKinney, TX (US)

(73) Assignee: Alto-Shaam, Inc., Menomonee Falls, WI (US)

( * ) Notice: Subject to any disclaimer, the term of this patent is extended or adjusted under 35 U.S.C. 154(b) by 188 days.

(21) Appl. No.: 15/094,645

(22) Filed: Apr. 8, 2016

(65) Prior Publication Data

US 2016/0356506 A1    Dec. 8, 2016

Related U.S. Application Data

(63) Continuation-in-part of application No. 15/016,093, filed on Feb. 4, 2016, now Pat. No. 9,879,865, and a
(Continued)

(51) Int. Cl.
*F24C 15/32* (2006.01)
*F24C 15/18* (2006.01)
(Continued)

(52) U.S. Cl.
CPC .......... *F24C 15/322* (2013.01); *A21B 1/245* (2013.01); *F24C 15/16* (2013.01); *F24C 15/18* (2013.01)

(58) Field of Classification Search
CPC ........ F24C 15/322; F24C 15/18; F24C 15/16; A21B 1/245
(Continued)

(56) References Cited

U.S. PATENT DOCUMENTS 1,527,020 A    2/1925   Valliant
2,098,295 A   11/1937   Kettering et al.
(Continued)

FOREIGN PATENT DOCUMENTS

CN    202066327 U    12/2011
EP    0002784 A1      7/1979
(Continued)

OTHER PUBLICATIONS

International Search Report for PCT/US2016/030736 dated Aug. 4, 2016.
Written Opinion of International Searching Authority for PCT/US2016/030736 dated Aug. 4, 2016.
International Search Report for PCT/US2016/030778 dated Aug. 4, 2016.
(Continued)

*Primary Examiner* — Avinash A Savani
*Assistant Examiner* — Rabeeul I Zuberi
(74) *Attorney, Agent, or Firm* — Boyle Fredrickson S.C.

(57) ABSTRACT

A convection oven having one or more intermediate air plenums is disclosed. An intermediate air plenum placed within an oven cavity defines the bottom of an upper cooking chamber and the top of a lower cooking chamber. Each intermediate air plenum comprises a left side air inlet for receiving heated air from a left side air channel located on a left side cavity wall of the oven cavity, a right side air inlet for receiving heated air from a right side air channel located on a right side cavity wall of the oven cavity, a top plenum surface including a plurality of top air outlets configured to direct a portion of the heated air upwards, and a bottom plenum surface including a plurality of bottom air outlets configured to direct a portion of the heated air downwards. The top and bottom plenum surfaces are preferably shaped to optimize even distribution of heated air flow into the oven cavity.

18 Claims, 13 Drawing Sheets

Related U.S. Application Data continuation-in-part of application No. 14/733,533, filed on Jun. 8, 2015, now Pat. No. 9,677,774.

(51) Int. Cl.
*A21B 1/24* (2006.01)
*F24C 15/16* (2006.01)

(58) Field of Classification Search
USPC .......................... 126/21 A, 21 R, 15 R, 15 A
See application file for complete search history.

(56) References Cited

U.S. PATENT DOCUMENTS

| | | | |
|---|---|---|---|
| 2,214,630 A | 9/1940 | Wheeler | |
| 2,305,056 A | 12/1942 | Austin | |
| 2,491,687 A | 12/1949 | Nutt | |
| 2,513,846 A | 7/1950 | Collins | |
| 2,593,077 A * | 4/1952 | Vogt | A47J 43/18 |
| | | | 126/337 R |
| 2,683,795 A | 7/1954 | Sheidler | |
| 2,715,898 A | 8/1955 | Michaelis et al. | |
| 2,940,381 A | 8/1960 | Cottongim et al. | |
| 3,221,729 A | 12/1965 | Beasley et al. | |
| 3,232,072 A | 2/1966 | Barroero | |
| 3,304,406 A | 2/1967 | King | |
| 3,326,201 A | 6/1967 | Murray | |
| 3,335,499 A | 8/1967 | Larsson | |
| 3,514,576 A | 5/1970 | Hilton et al. | |
| 3,538,904 A | 11/1970 | Baker | |
| 3,568,590 A | 3/1971 | Grice | |
| 3,658,047 A | 4/1972 | Happel | |
| 3,674,982 A | 7/1972 | Hoyt | |
| 3,712,285 A * | 1/1973 | Copeland | A47J 37/0786 |
| | | | 126/274 |
| 3,789,516 A | 2/1974 | Schraft et al. | |
| 3,828,760 A | 8/1974 | Farber et al. | |
| 3,884,213 A | 5/1975 | Smith | |
| 3,908,533 A | 9/1975 | Fagerstrom et al. | |
| 3,935,809 A | 2/1976 | Bauer | |
| 3,946,651 A | 3/1976 | Garcia | |
| 4,038,968 A | 8/1977 | Rovell | |
| 4,110,916 A | 9/1978 | Bemrose | |
| 4,154,881 A | 5/1979 | Smith | |
| 4,162,141 A | 7/1979 | West | |
| 4,189,995 A | 2/1980 | Lohr et al. | |
| 4,307,286 A | 12/1981 | Guibert | |
| 4,307,659 A | 12/1981 | Martin et al. | |
| 4,313,485 A | 2/1982 | Gidge et al. | |
| 4,323,110 A | 4/1982 | Rubbright et al. | |
| 4,326,342 A | 4/1982 | Schregenberger | |
| 4,338,911 A | 7/1982 | Smith | |
| 4,354,549 A | 10/1982 | Smith | |
| 4,366,177 A | 12/1982 | Wells et al. | |
| 4,374,319 A | 2/1983 | Guibert | |
| 4,377,109 A | 3/1983 | Brown et al. | |
| 4,381,442 A | 4/1983 | Guibert | |
| 4,389,562 A | 6/1983 | Chaudoir | |
| 4,395,233 A | 7/1983 | Smith | |
| 4,397,299 A | 8/1983 | Taylor et al. | |
| 4,404,898 A | 9/1983 | Chaudoir | |
| 4,455,478 A | 6/1984 | Guibert | |
| 4,462,383 A | 7/1984 | Henke et al. | |
| 4,471,750 A | 9/1984 | Burtea | |
| 4,472,887 A | 9/1984 | Avedian et al. | |
| 4,474,498 A | 10/1984 | Smith | |
| 4,479,776 A | 10/1984 | Smith | |
| 4,484,561 A | 11/1984 | Baggott et al. | |
| 4,492,839 A | 1/1985 | Smith | |
| 4,515,143 A | 5/1985 | Jabas | |
| 4,516,012 A | 5/1985 | Smith et al. | |
| 4,601,237 A | 7/1986 | Harter et al. | |
| 4,605,038 A | 8/1986 | Tchitdjian | |
| 4,625,867 A | 12/1986 | Guibert | |
| 4,626,661 A | 12/1986 | Henke | |
| 4,631,029 A | 12/1986 | Lanham et al. | |
| 4,690,127 A | 9/1987 | Sank | |
| 4,700,619 A | 10/1987 | Scanlon | |
| 4,714,050 A | 12/1987 | Nichols | |
| 4,722,683 A | 2/1988 | Royer | |
| 4,727,863 A | 3/1988 | Stephan et al. | |
| 4,739,154 A | 4/1988 | Bharara et al. | |
| 4,750,276 A | 6/1988 | Smith et al. | |
| 4,757,800 A | 7/1988 | Shei et al. | |
| 4,822,981 A | 4/1989 | Chaudoir | |
| 4,829,158 A | 5/1989 | Burnham | |
| 4,829,982 A | 5/1989 | Abidor | |
| 4,835,351 A | 5/1989 | Smith et al. | |
| 4,865,864 A | 9/1989 | Rijswijck | |
| 4,867,132 A | 9/1989 | Yencha | |
| 4,870,254 A | 9/1989 | Arabori | |
| 4,876,426 A | 10/1989 | Smith | |
| 4,892,030 A | 1/1990 | Grieve | |
| 4,895,137 A | 1/1990 | Jones et al. | |
| 4,928,663 A | 5/1990 | Nevin et al. | |
| 4,951,645 A | 8/1990 | Luebke et al. | |
| 4,960,977 A | 10/1990 | Alden | |
| 4,965,435 A | 10/1990 | Smith et al. | |
| 4,981,416 A | 1/1991 | Nevin et al. | |
| 4,994,181 A | 2/1991 | Mullaney, Jr. | |
| 5,025,775 A | 6/1991 | Crisp | |
| 5,050,578 A | 9/1991 | Luebke et al. | |
| 5,121,737 A | 6/1992 | Yencha, III | |
| 5,172,682 A | 12/1992 | Luebke et al. | |
| 5,180,898 A | 1/1993 | Alden et al. | |
| 5,211,106 A | 5/1993 | Lucke | |
| 5,218,950 A * | 6/1993 | Hait | A47J 37/0704 |
| | | | 126/25 R |
| 5,222,474 A | 6/1993 | Yencha, III | |
| 5,223,290 A | 6/1993 | Alden | |
| 5,228,385 A | 7/1993 | Friedrich et al. | |
| 5,231,920 A | 8/1993 | Alden et al. | |
| 5,254,823 A | 10/1993 | McKee et al. | |
| 5,272,317 A | 12/1993 | Ryu | |
| 5,309,981 A | 5/1994 | Birder | |
| 5,345,923 A | 9/1994 | Luebke et al. | |
| 5,361,749 A | 11/1994 | Smith et al. | |
| 5,365,039 A | 11/1994 | Chaudoir | |
| 5,404,935 A | 4/1995 | Liebermann | |
| 5,421,316 A | 6/1995 | Heber | |
| 5,421,317 A | 6/1995 | Cole et al. | |
| 5,434,390 A | 7/1995 | McKee et al. | |
| 5,454,295 A | 10/1995 | Cox et al. | |
| 5,458,051 A | 10/1995 | Alden et al. | |
| 5,460,157 A | 10/1995 | Prabhu | |
| 5,483,044 A | 1/1996 | Thorneywork et al. | |
| 5,492,055 A | 2/1996 | Nevin et al. | |
| 5,497,760 A | 3/1996 | Alden et al. | |
| 5,507,382 A | 4/1996 | Hartwell et al. | |
| 5,520,095 A | 5/1996 | Huber et al. | |
| 5,530,223 A | 6/1996 | Culzoni et al. | |
| 5,558,793 A | 9/1996 | McKee et al. | |
| 5,572,984 A | 11/1996 | Alden et al. | |
| 5,577,438 A | 11/1996 | Amitrano et al. | |
| 5,582,093 A | 12/1996 | Amitrano et al. | |
| 5,620,731 A | 4/1997 | McKee | |
| 5,647,740 A | 7/1997 | Kobaru | |
| 5,655,511 A | 8/1997 | Prahhu et al. | |
| 5,676,044 A | 10/1997 | Lara, Jr. | |
| 5,683,240 A | 11/1997 | Smith et al. | |
| 5,720,273 A | 2/1998 | Trullas | |
| 5,747,775 A | 5/1998 | Tsukamoto et al. | |
| 5,847,365 A | 12/1998 | Harter et al. | |
| 5,880,436 A | 3/1999 | Keogh | |
| 5,908,574 A | 6/1999 | Keogh | |
| 5,927,265 A | 7/1999 | McKee et al. | |
| 5,928,072 A | 7/1999 | Fulcher et al. | |
| 5,928,541 A | 7/1999 | Tsukamoto et al. | |
| 5,934,178 A | 8/1999 | Caridis et al. | |
| 5,934,182 A | 8/1999 | Harter et al. | |
| 5,941,235 A | 8/1999 | Carter | |
| 5,951,901 A | 9/1999 | Douglas et al. | |
| 5,954,986 A | 9/1999 | Tsukerhote et al. | |
| 5,988,154 A | 11/1999 | Douglas et al. | |

(56) References Cited

U.S. PATENT DOCUMENTS

| | | |
|---|---|---|
| 5,990,466 A | 11/1999 | McKee et al. |
| 5,994,673 A | 11/1999 | El-Shoubary |
| 6,008,483 A | 12/1999 | McKee et al. |
| 6,031,208 A | 2/2000 | Witt et al. |
| 6,049,066 A | 4/2000 | Wilson |
| 6,058,924 A | 5/2000 | Pool, III et al. |
| 6,060,701 A | 5/2000 | McKee et al. |
| 6,064,050 A | 5/2000 | Ishikawa et al. |
| 6,079,321 A | 6/2000 | Harter et al. |
| 6,111,224 A | 8/2000 | Witt |
| 6,116,895 A | 9/2000 | Onuschak |
| 6,140,619 A | 10/2000 | Couch |
| 6,140,626 A | 10/2000 | McKee et al. |
| 6,146,678 A | 11/2000 | Caridis et al. |
| 6,175,099 B1 | 1/2001 | Shei et al. |
| 6,192,877 B1 | 2/2001 | Moshonas et al. |
| 6,218,650 B1 | 4/2001 | Tsukamoto et al. |
| 6,252,201 B1 | 6/2001 | Nevarez |
| 6,259,064 B1 | 7/2001 | Wilson |
| 6,262,394 B1 | 7/2001 | Shei et al. |
| 6,262,396 B1 | 7/2001 | Witt et al. |
| 6,262,406 B1 | 7/2001 | McKee et al. |
| 6,320,165 B1 | 11/2001 | Ovadia |
| 6,323,462 B1 | 11/2001 | Strand |
| 6,350,965 B2 | 2/2002 | Fukushima et al. |
| 6,359,271 B1 | 3/2002 | Gidner et al. |
| 6,376,817 B1 * | 4/2002 | McFadden ............. A21B 1/245 126/21 A |
| 6,378,602 B2 | 4/2002 | Brown |
| 6,384,381 B2 | 5/2002 | Witt et al. |
| 6,399,930 B2 | 6/2002 | Day et al. |
| 6,403,937 B1 | 6/2002 | Day et al. |
| 6,425,388 B1 | 7/2002 | Korinchock |
| 6,441,355 B2 | 8/2002 | Thorneywork |
| 6,455,085 B1 | 9/2002 | Duta |
| 6,476,368 B2 | 11/2002 | Aronsson et al. |
| 6,486,455 B1 | 11/2002 | Merabet |
| 6,494,130 B2 | 12/2002 | Brown |
| 6,517,882 B2 | 2/2003 | Elia et al. |
| 6,526,961 B1 | 3/2003 | Hardenburger |
| 6,528,773 B2 | 3/2003 | Kim et al. |
| 6,534,688 B2 | 3/2003 | Klausmeyer |
| 6,539,934 B2 | 4/2003 | Moshonas et al. |
| 6,541,739 B2 | 4/2003 | Shei et al. |
| 6,552,305 B2 | 4/2003 | De'Longhi |
| 6,572,911 B1 * | 6/2003 | Corcoran ............. A21B 1/245 426/510 |
| 6,576,874 B2 | 6/2003 | Zapata et al. |
| 6,592,364 B2 | 7/2003 | Zapata |
| 6,595,117 B1 * | 7/2003 | Jones ................... A21B 1/245 99/386 |
| 6,614,007 B1 | 9/2003 | Reay |
| 6,655,373 B1 * | 12/2003 | Wiker .................. A21B 1/245 126/21 A |
| 6,660,982 B2 | 12/2003 | Thorneywork |
| 6,692,788 B1 | 2/2004 | Mottram et al. |
| 6,693,261 B2 | 2/2004 | Leutner |
| 6,712,063 B1 | 3/2004 | Thorneywork |
| 6,712,064 B2 | 3/2004 | Stacy et al. |
| 6,716,467 B2 | 4/2004 | Cole et al. |
| 6,805,112 B2 | 10/2004 | Cole et al. |
| 6,817,201 B2 | 11/2004 | Yingst |
| 6,817,283 B2 | 11/2004 | Jones et al. |
| 6,818,869 B2 | 11/2004 | Patti et al. |
| 6,833,032 B1 | 12/2004 | Douglas et al. |
| 6,833,533 B1 | 12/2004 | Wolfe et al. |
| 6,869,538 B2 | 3/2005 | Yu et al. |
| 6,874,495 B2 | 4/2005 | McFadden |
| 6,880,545 B2 | 4/2005 | Heber et al. |
| 6,903,318 B2 | 6/2005 | Thorneywork |
| 6,914,221 B1 | 7/2005 | Witt et al. |
| 6,933,472 B1 | 8/2005 | Smith et al. |
| 6,933,473 B2 | 8/2005 | Henke et al. |
| 6,934,690 B1 | 8/2005 | Van Horn et al. |
| 6,943,321 B2 | 9/2005 | Carbone et al. |
| 6,968,565 B1 | 11/2005 | Slaney et al. |
| 7,019,272 B2 | 3/2006 | Braunisch et al. |
| 7,055,518 B2 | 6/2006 | McFadden et al. |
| 7,082,941 B2 | 8/2006 | Jones et al. |
| 7,087,872 B1 * | 8/2006 | Dobie .................. F24C 15/166 219/401 |
| 7,105,779 B2 | 9/2006 | Shei |
| 7,192,272 B2 | 3/2007 | Jones et al. |
| 7,196,291 B2 | 3/2007 | Cothran |
| 7,220,946 B2 | 5/2007 | Majchrzak |
| 7,227,102 B2 | 6/2007 | Shei |
| 7,326,882 B2 | 2/2008 | Faries, Jr. et al. |
| 7,328,654 B2 | 2/2008 | Shei |
| 7,328,695 B2 | 2/2008 | Tatsumu et al. |
| 7,329,847 B2 | 2/2008 | Tatsumu et al. |
| 7,343,912 B2 | 3/2008 | Jones et al. |
| 7,360,533 B2 | 4/2008 | McFadden |
| RE40,290 E | 5/2008 | Shei et al. |
| 7,370,647 B2 | 5/2008 | Thorneywork |
| 7,424,848 B2 | 9/2008 | Jones et al. |
| 7,435,931 B1 | 10/2008 | McKee et al. |
| 7,446,282 B2 | 11/2008 | Shei et al. |
| 7,468,495 B2 | 12/2008 | Carbone et al. |
| 7,480,627 B1 | 1/2009 | Van Horn et al. |
| 7,493,362 B2 | 2/2009 | Bogatin et al. |
| 7,507,938 B2 | 3/2009 | McFadden |
| 7,554,057 B2 | 6/2009 | Monny Dimouamoua |
| 7,575,000 B2 | 8/2009 | Jones et al. |
| 7,604,002 B2 | 10/2009 | Rabas et al. |
| 7,624,676 B2 | 12/2009 | Nishida et al. |
| 7,624,728 B1 | 12/2009 | Forbes |
| 7,781,702 B2 | 8/2010 | Nam et al. |
| 7,784,457 B2 * | 8/2010 | Akdag ................. F24C 15/322 126/21 A |
| 7,792,920 B2 | 9/2010 | Istvan et al. |
| 7,793,586 B2 | 9/2010 | Rabas |
| 7,825,358 B2 | 11/2010 | Kim |
| 7,836,874 B2 | 11/2010 | McFadden |
| 7,836,875 B2 | 11/2010 | McFadden et al. |
| 7,884,306 B2 | 2/2011 | Leach |
| 7,886,658 B2 | 2/2011 | McFadden et al. |
| 7,900,228 B2 | 3/2011 | Stark et al. |
| 7,905,173 B2 | 3/2011 | Sus et al. |
| 7,910,866 B2 | 3/2011 | Hwang et al. |
| 7,921,841 B2 | 4/2011 | McKee et al. |
| 7,941,819 B2 | 5/2011 | Stark et al. |
| 7,942,278 B2 | 5/2011 | Martin et al. |
| 7,946,224 B2 | 5/2011 | McFadden |
| 7,956,304 B2 | 6/2011 | Bacigalupe et al. |
| 8,006,685 B2 | 8/2011 | Bolton et al. |
| 8,011,293 B2 | 9/2011 | McFadden et al. |
| 8,029,274 B2 | 10/2011 | Jones et al. |
| 8,035,062 B2 | 10/2011 | McFadden |
| 8,035,065 B2 | 10/2011 | Kim et al. |
| 8,042,633 B2 | 10/2011 | Dobie et al. |
| 8,047,128 B2 | 11/2011 | Salvaro |
| 8,058,590 B2 | 11/2011 | Thorneywork et al. |
| 8,058,594 B2 | 11/2011 | Hwang |
| 8,063,342 B2 | 11/2011 | Hines, Jr. |
| 8,071,922 B2 | 12/2011 | Claesson et al. |
| 8,093,538 B2 | 1/2012 | Claesson et al. |
| 8,113,190 B2 | 2/2012 | Dougherty |
| 8,124,200 B2 | 2/2012 | Quella et al. |
| 8,134,101 B2 | 3/2012 | Majohrzak |
| 8,134,102 B2 | 3/2012 | McKee et al. |
| 8,136,442 B2 | 3/2012 | Strutin-Belinoff et al. |
| 8,143,560 B2 | 3/2012 | Park et al. |
| 8,164,036 B2 | 4/2012 | Lee |
| 8,168,928 B2 | 5/2012 | Kim et al. |
| 8,210,844 B2 | 7/2012 | Wolfe et al. |
| 8,212,188 B2 | 7/2012 | Kim et al. |
| 8,218,955 B2 | 7/2012 | Witt |
| 8,224,892 B2 | 7/2012 | Bogatin et al. |
| 8,253,084 B2 | 8/2012 | Toyoda et al. |
| 8,258,440 B2 | 9/2012 | Shei et al. |
| 8,292,494 B2 | 10/2012 | Rosa et al. |
| 8,297,270 B2 | 10/2012 | McFadden |
| 8,299,404 B2 * | 10/2012 | Van Der Weij ....... F24C 15/322 126/21 A |

(56) References Cited

U.S. PATENT DOCUMENTS

| | | | |
|---|---|---|---|
| 8,304,702 B2 | 11/2012 | Kim | |
| 8,338,756 B2 | 12/2012 | Shei et al. | |
| 8,359,351 B2 | 1/2013 | Istvan et al. | |
| 8,378,265 B2 | 2/2013 | Greenwood et al. | |
| 8,389,907 B2 | 3/2013 | Willett | |
| 8,399,812 B2 | 3/2013 | Thorneywork et al. | |
| 8,490,475 B2 | 7/2013 | Dejmek et al. | |
| 8,561,321 B2 | 10/2013 | Inoue et al. | |
| 8,586,900 B2 | 11/2013 | Kim et al. | |
| 8,637,792 B2 | 1/2014 | Agnello et al. | |
| 8,658,953 B2 | 2/2014 | McFadden et al. | |
| 8,662,070 B2 * | 3/2014 | Johnston | A47J 37/0713 126/25 A |
| 8,680,439 B2 | 3/2014 | Shei et al. | |
| 8,680,449 B2 | 3/2014 | Kim | |
| 8,695,487 B2 | 4/2014 | Sakane et al. | |
| 8,707,945 B2 | 4/2014 | Hasslberger et al. | |
| 8,733,236 B2 | 5/2014 | McKee | |
| 8,735,778 B2 | 5/2014 | Greenwood et al. | |
| 8,746,134 B2 | 6/2014 | McKee | |
| 8,893,705 B2 | 11/2014 | McFadden | |
| 8,895,902 B2 | 11/2014 | Shei et al. | |
| 8,941,041 B2 | 1/2015 | Lee | |
| 8,968,848 B2 | 3/2015 | Quella et al. | |
| 8,991,383 B2 | 3/2015 | Johnson | |
| 8,993,945 B2 | 3/2015 | McKee et al. | |
| 9,074,776 B2 | 7/2015 | Greenwood et al. | |
| 9,074,777 B2 | 7/2015 | Catalogne et al. | |
| 9,134,033 B2 | 9/2015 | Nevarez et al. | |
| 9,157,639 B2 | 10/2015 | Gallici et al. | |
| 9,161,547 B2 | 10/2015 | McKee | |
| RE45,789 E | 11/2015 | Shei et al. | |
| 9,265,400 B2 | 2/2016 | Bigott | |
| 9,277,598 B2 | 3/2016 | Lee et al. | |
| 9,288,997 B2 | 3/2016 | McKee | |
| 9,301,646 B2 | 4/2016 | Rosa et al. | |
| 9,303,879 B2 | 4/2016 | Price et al. | |
| 9,326,639 B2 | 5/2016 | McKee et al. | |
| 9,341,382 B2 | 5/2016 | Kim | |
| 9,351,495 B2 | 5/2016 | McFadden | |
| 9,372,006 B2 | 6/2016 | McKee et al. | |
| 9,474,284 B2 | 10/2016 | Dougherty | |
| 9,480,364 B2 | 11/2016 | McKee et al. | |
| 9,516,704 B2 | 12/2016 | Stanger | |
| 2001/0025842 A1 | 10/2001 | Witt et al. | |
| 2002/0003140 A1 | 1/2002 | Day et al. | |
| 2002/0134778 A1 | 9/2002 | Day et al. | |
| 2003/0141296 A1 | 7/2003 | Thorneywork | |
| 2004/0026401 A1 | 2/2004 | Jones et al. | |
| 2004/0163635 A1 | 8/2004 | Thorneywork | |
| 2005/0000957 A1 | 1/2005 | Jones et al. | |
| 2005/0045173 A1 | 3/2005 | Heber et al. | |
| 2005/0173397 A1 | 8/2005 | Majchrzak et al. | |
| 2005/0205547 A1 | 9/2005 | Wenzel | |
| 2005/0211109 A1 | 9/2005 | Majchrzak et al. | |
| 2005/0258171 A1 | 11/2005 | Witt | |
| 2006/0020962 A1 | 1/2006 | Stark et al. | |
| 2006/0026636 A1 | 2/2006 | Stark et al. | |
| 2006/0026638 A1 | 2/2006 | Stark et al. | |
| 2006/0031880 A1 | 2/2006 | Stark et al. | |
| 2006/0041927 A1 | 2/2006 | Stark et al. | |
| 2006/0064720 A1 | 3/2006 | Istvan et al. | |
| 2006/0080408 A1 | 4/2006 | Istvan et al. | |
| 2006/0085825 A1 | 4/2006 | Istvan et al. | |
| 2006/0085835 A1 | 4/2006 | Istvan et al. | |
| 2006/0102017 A1 | 5/2006 | Rabas et al. | |
| 2006/0201495 A1 | 9/2006 | Jones et al. | |
| 2007/0092670 A1 | 4/2007 | Quella et al. | |
| 2007/0108179 A1 | 5/2007 | Hines, Jr. | |
| 2007/0125319 A1 | 6/2007 | Jones et al. | |
| 2007/0210064 A1 | 9/2007 | Quella et al. | |
| 2008/0008795 A1 | 1/2008 | Thorneywork et al. | |
| 2008/0092754 A1 | 4/2008 | Noman | |
| 2008/0105136 A1 | 5/2008 | McFadden | |
| 2008/0105249 A1 | 5/2008 | McFadden et al. | |
| 2008/0106133 A1 | 5/2008 | McFadden et al. | |
| 2008/0106483 A1 | 5/2008 | McFadden et al. | |
| 2008/0127833 A1 | 6/2008 | Lee | |
| 2008/0134903 A1 | 6/2008 | Kim et al. | |
| 2008/0148961 A1 | 6/2008 | Hwang et al. | |
| 2008/0148963 A1 | 6/2008 | Kim et al. | |
| 2008/0149628 A1 | 6/2008 | Thorneywork et al. | |
| 2008/0149630 A1 | 6/2008 | Hwang | |
| 2008/0149631 A1 | 6/2008 | Lee | |
| 2008/0149632 A1 | 6/2008 | Kim et al. | |
| 2008/0149633 A1 | 6/2008 | Kim | |
| 2008/0156202 A1 | 7/2008 | Park et al. | |
| 2008/0245359 A1 | 10/2008 | Williamson | |
| 2008/0296284 A1 | 12/2008 | McFadden et al. | |
| 2008/0302253 A1 | 12/2008 | Salvaro | |
| 2009/0095727 A1 | 4/2009 | Majchrzak | |
| 2009/0139367 A1 | 6/2009 | Rosa et al. | |
| 2009/0142719 A1 | 6/2009 | Scheuring, III et al. | |
| 2009/0165778 A1 | 7/2009 | Harter et al. | |
| 2009/0222612 A1 | 9/2009 | Thorneywork et al. | |
| 2010/0000509 A1 | 1/2010 | Babington | |
| 2010/0031193 A1 | 2/2010 | Stark et al. | |
| 2010/0054717 A1 | 3/2010 | Lee et al. | |
| 2010/0058936 A1 | 3/2010 | Schjerven, Sr. et al. | |
| 2010/0126979 A1 | 5/2010 | Willett | |
| 2010/0133263 A1 | 6/2010 | Toyoda et al. | |
| 2010/0166398 A1 | 7/2010 | Witt | |
| 2010/0320198 A1 | 12/2010 | Kim | |
| 2010/0320199 A1 | 12/2010 | Kim | |
| 2010/0326290 A1 | 12/2010 | Gallici et al. | |
| 2010/0332994 A1 | 12/2010 | Istvan et al. | |
| 2011/0005409 A1 | 1/2011 | Majchrzak | |
| 2011/0083657 A1 | 4/2011 | Ploof et al. | |
| 2011/0126818 A1 | 8/2011 | Behle et al. | |
| 2012/0017770 A1 | 1/2012 | Sakane et al. | |
| 2012/0021100 A1 | 1/2012 | Thorneywork et al. | |
| 2012/0067226 A1 | 3/2012 | Claesson et al. | |
| 2012/0118878 A1 | 5/2012 | Jussel | |
| 2012/0138597 A1 | 6/2012 | Quella et al. | |
| 2012/0187115 A1 | 7/2012 | Toyoda et al. | |
| 2012/0192725 A1 | 8/2012 | Toyoda et al. | |
| 2012/0248095 A1 | 10/2012 | Lee et al. | |
| 2012/0328752 A1 | 12/2012 | Green et al. | |
| 2013/0004830 A1 | 1/2013 | McFadden | |
| 2013/0175253 A1 | 7/2013 | Shei et al. | |
| 2013/0220296 A1 | 8/2013 | Catalogne et al. | |
| 2013/0255657 A1 | 10/2013 | Schootstra et al. | |
| 2013/0306052 A1 | 11/2013 | Price et al. | |
| 2013/0306616 A1 | 11/2013 | Wildebush | |
| 2014/0026764 A1 | 1/2014 | Sykes et al. | |
| 2014/0048055 A1 | 2/2014 | Ruther | |
| 2014/0083309 A1 | 3/2014 | Reese et al. | |
| 2014/0099420 A1 | 4/2014 | Petronio et al. | |
| 2014/0116268 A1 | 5/2014 | Bigott et al. | |
| 2014/0137852 A1 | 5/2014 | Radford et al. | |
| 2014/0161952 A1 | 6/2014 | Sykes | |
| 2014/0161953 A1 | 6/2014 | Jones et al. | |
| 2014/0174426 A1 | 6/2014 | Moon et al. | |
| 2014/0202444 A1 | 7/2014 | Dobie | |
| 2014/0216267 A1 | 8/2014 | McKee | |
| 2014/0217083 A1 | 8/2014 | McKee | |
| 2014/0231407 A1 | 8/2014 | Kantas | |
| 2014/0261373 A1 | 9/2014 | Yingst et al. | |
| 2014/0290003 A1 | 10/2014 | Mick et al. | |
| 2014/0318387 A1 | 10/2014 | Kim | |
| 2014/0322417 A1 | 10/2014 | Kim | |
| 2014/0326710 A1 | 11/2014 | McKee et al. | |
| 2015/0047514 A1 | 2/2015 | Abe et al. | |
| 2016/0050939 A1 | 2/2016 | Riggle et al. | |
| 2016/0066585 A1 | 3/2016 | Lago | |
| 2016/0273843 A1 | 9/2016 | Wenzel | |
| 2016/0327278 A1 | 11/2016 | McKee et al. | |
| 2016/0345592 A1 | 12/2016 | McKee et al. | |
| 2016/0348920 A1 | 12/2016 | Yingst et al. | |
| 2016/0356505 A1 | 12/2016 | McKee et al. | |
| 2016/0356506 A1 | 12/2016 | McKee et al. | |

(56) References Cited

U.S. PATENT DOCUMENTS

2016/0358504 A1 12/2016 McKee et al.
2017/0010003 A1 1/2017 Dougherty

FOREIGN PATENT DOCUMENTS

| | | |
|---|---|---|
| EP | 1624256 A1 | 2/2006 |
| EP | 1672284 A1 | 6/2006 |
| EP | 1732359 A2 | 12/2006 |
| EP | 2735806 A1 | 5/2014 |
| WO | 00064219 A1 | 10/2000 |
| WO | 2005023006 A2 | 3/2005 |
| WO | 2012/062679 A1 | 5/2012 |
| WO | 2015101399 A1 | 7/2015 |
| WO | 2015/175366 A1 | 11/2015 |

OTHER PUBLICATIONS

Written Opinion of International Searching Authority for PCT/US2016/030778 dated Aug. 4, 2016.

Charlotte Atchley, Uniting Technologies, dated Feb. 1, 2015. See http://www.bakingbusiness.com/Features/Operations/2015/2/Uniting%20Technologies.aspx?cck=1.

Multi-zone Temperature & Time Controller (TC10263). See http://www.degreec.com/en/application-overview/food-equipment/multizone-thermal-controller-tc10263.html (last visited Jun. 8, 2015).

International Search Report for PCT/US2016/030718 dated Jul. 27, 2016.

Written Opinion of International Searching Authority for PCT/US2016/030718 dated Jul. 27, 2016.

* cited by examiner

CONVECTION OVEN

CROSS REFERENCE TO RELATED APPLICATIONS

This application is a continuation-in-part of U.S. application Ser. No. 15/016,093, filed on Feb. 4, 2016, and a continuation-in-part of U.S. application Ser. No. 14/733,533, filed on Jun. 8, 2015, the entire contents of all of which are incorporated herein by reference.

FIELD OF THE INVENTION

The present invention generally relates to cooking ovens and, in particular, to a convection oven having one or more air plenums.

BACKGROUND OF THE INVENTION

An oven generally includes an oven cavity configured to receive food articles for cooking. The oven also includes a heating element, which can be an electric resistance element or a gas burner, for generating heat energy to cook any food items placed within an oven cavity. Some ovens may include a fan for forcing movement of heated air within the oven cavity, and those ovens are commonly referred to as convection ovens.

Convection ovens have been the workhorse in commercial kitchens for many decades. Commercial convection ovens generally come in two sizes, namely, full-size and half-size. Full-sized commercial convection ovens are designed to fit within the space of an industry standard footprint, which is approximately 40 inches wide by 40 inches deep, made available for full-sized convection ovens in most commercial kitchens. The oven cavity of full-sized commercial convection ovens are also dimensioned to accept industry standard full-sized cooking trays, which are approximately 26 inches wide by 18 inches deep. The height of the cook cavity is typically about 20 inches, which is capable of being configured to allow for multiple rack heights, such as 11 possible rack heights, to accommodate the height of various foods that can be cooked in a convection oven. For example, only 2 racks may be placed in a commercial convection oven if 9-inch tall turkeys are being cooked, but 4 to 5 racks may be evenly spaced from top to bottom when that many racks of 2-inch tall lasagna are being cooked. Half-sized commercial convection ovens are similarly configured and dimensioned to fit into industry standard half-sized spaces in commercial kitchens and to receive industry standard half-sized sheet pans.

When cooking in a typical convection oven, heated air within the oven cavity is circulated by a fan. The fan typically initiates a flow of heated air by pulling air from the oven cavity through one or more return air openings on a back cavity wall of the oven cavity. The heated air then exits other openings on the side cavity walls or top and bottom cavity walls of the oven cavity. The heated air moves through the oven cavity to help distribute heat energy to food articles placed within the oven cavity. An example of the heating system of a typical convection oven can be found in U.S. Pat. No. 4,395,233 to Smith et al.

One problem with the heating system of a conventional convection oven is that it can generate regions of high and low speed air flow in the oven cavity such that the heated air is not uniformly distributed within the oven cavity. As a result, food items placed in the oven cavity may be cooked unevenly. For example, food items placed on different racks at different heights within the convection oven may be cooked at different rates. In addition, food items placed on the same rack may not receive uniform heating either. This unevenness of cooking can result in food waste, as food items located in the higher heat portions of the oven cavity can be unacceptably overdone as compared to the food items located in the lower heat portions. Unevenness of cooking can be partially overcome by rotating cook trays within the oven cavity, as well as utilizing reduced cooking temperatures and blower speeds, but doing so will increase skilled labor requirements as well as cook times.

Accordingly, there is a need for an improved convection oven which overcomes the problems identified above.

SUMMARY OF THE INVENTION

It has now been found that the above and related objects of the present invention are obtained in the form of several related aspects, including a convection oven having one or more air plenums.

The present invention relates to a convection oven comprising a housing having an oven cavity and an oven door for access to the oven cavity, a left side air channel located on a left side cavity wall of the oven cavity, a right side air channel located on a right side cavity wall of the oven cavity, an air blower for sending heated air to the left side air channel and the right side air channel, and an intermediate air plenum defining the bottom of an upper cooking chamber and the top of a lower cooking chamber within the oven cavity.

The intermediate air plenum comprises a left side air inlet configured to receive a portion of the heated air from the left side air channel, a right side air inlet configured to receive a portion of the heated air from the right side air channel, a top plenum surface defining the top of the interior space of the intermediate air plenum and including a plurality of top air outlets, the top air outlets being configured to direct a portion of the heated air received through the left side air inlet and the right side air inlet upwards into the upper cooking chamber, and a bottom plenum surface defining the bottom of the interior space of the intermediate air plenum and including a plurality of bottom air outlets, the bottom air outlets being configured to direct a portion of the heated air received through the left side air inlet and the right side air inlet downwards into the lower cooking chamber.

In at least one embodiment, the top air outlets and the bottom air outlets of the intermediate air plenum are offset from each other.

In at least one embodiment, the intermediate air plenum further comprises a front surface, and a rear surface, wherein each of the front and rear surfaces is substantially air impermeable so that substantially no air flow is permitted through either the front surface or the rear surface.

In at least one embodiment, at least one of the top plenum surface and the bottom plenum surface of the intermediate air plenum is curved.

In at least one embodiment, the top plenum surface and the bottom plenum surface are both curved toward each other such that a vertical spacing between the top plenum surface and the bottom plenum surface at the left side air inlet is substantially equal to a vertical spacing between the top plenum surface and the bottom plenum surface at the right side air inlet, and the vertical spacing between the top plenum surface and the bottom plenum surface at the left side air inlet or at the right side air inlet is greater than a vertical spacing between the top plenum surface and the bottom plenum surface at a midpoint of the intermediate air plenum.

In at least one embodiment, a front cross-section of the top plenum surface and the bottom plenum surface of the intermediate air plenum comprises two substantially hyperbolic curves.

In at least one embodiment, the intermediate air plenum comprising two hyperbolically curved surfaces as top and bottom plenum surfaces is removable from the oven cavity.

In at least one embodiment, the vertical spacing between the top plenum surface and the bottom plenum surface at the right side air inlet or at the left side air inlet is between 1.5 inches and 3.0 inches and the vertical spacing between the top plenum surface and the bottom plenum surface at the midpoint of the intermediate air plenum is between 0.25 inches and 1.25 inches.

In at least one embodiment, each of the front and rear widths of the intermediate air plenum is between 20 inches and 30 inches and each of the left and right side lengths of the intermediate air plenum is between 15 inches and 25 inches.

In at least one embodiment, the left side air inlet is directly connected to the left side air channel, and the right side air inlet is permanently connected to the right side air channel.

In at least one embodiment, the left side air inlet is removably connected to the left side air channel, and the right side air inlet is removably connected to the right side air channel.

In at least one embodiment, each of the left side air channel and the right side air channel is coverable by a flap if not connected to the corresponding one of the left side air inlet and the right side air inlet.

In at least one embodiment, the intermediate air plenum is removable from the oven cavity.

In at least one embodiment, the top plenum surface is configured to support a food rack for the upper cooking chamber.

In at least one embodiment, the convection oven further comprises a return air opening located on a back cavity wall of the oven cavity.

In at least one embodiment, the convection oven further comprises a top left side air channel located on the left side cavity wall near the top of the oven cavity and configured to receive a portion of the heated air from the air blower, a top right side air channel located on the right side cavity wall near the top of the oven cavity and configured to receive a portion of the heated air from the air blower, and a top air plenum located at the top of the oven cavity. The top air plenum comprises a left side air inlet configured to receive the portion of the heated air from the top left side air channel, a right side air inlet configured to receive the portion of the heated air from the top right side air channel, a top plenum surface defining the top of the interior space of the top air plenum, and a bottom plenum surface defining the bottom of the interior space of the top air plenum and including a plurality of air outlets, the air outlets being configured to direct the heated air received through the left side air inlet and the right side air inlet downwards into the oven cavity.

In at least one embodiment, the top air plenum is removable from the oven cavity.

In at least one embodiment, the top plenum surface of the top air plenum is planar and the bottom plenum surface of the top air plenum is curved.

In at least one embodiment, a vertical spacing between the top plenum surface and the bottom plenum surface of the top air plenum at the left side air inlet is substantially equal to a vertical spacing between the top plenum surface and the bottom plenum surface of the top air plenum at the right side air inlet, and the vertical spacing between the top plenum surface and the bottom plenum surface at the left side air inlet or at the right side air inlet is greater than a vertical spacing between the top plenum surface and the bottom plenum surface at a midpoint of the top air plenum.

In at least one embodiment, the convection oven further comprises a bottom left side air channel located on the left side cavity wall near the bottom of the oven cavity and configured to receive a portion of the heated air from the air blower, a bottom right side air channel located on the right side cavity wall near the bottom of the oven cavity and configured to receive a portion of the heated air from the air blower, and a bottom air plenum located at the bottom of the oven cavity. The bottom air plenum comprises a left side air inlet configured to receive the portion of the heated air from the bottom left side air channel, a right side air inlet configured to receive the portion of the heated air from the bottom right side air channel, a top plenum surface defining the top of the interior space of the bottom air plenum and including a plurality of air outlets, the air outlets being configured to direct the heated air received through the left side air inlet and the right side air inlet upwards into the oven cavity, and a bottom plenum surface defining the bottom of the interior space of the bottom air plenum.

In at least one embodiment, the bottom air plenum is removable from the oven cavity.

In at least one embodiment, the top plenum surface of the bottom air plenum is curved and the bottom plenum surface of the bottom air plenum is planar.

In at least one embodiment, a vertical spacing between the top plenum surface and the bottom plenum surface of the bottom air plenum at the left side air inlet is substantially equal to a vertical spacing between the top plenum surface and the bottom plenum surface of the bottom air plenum at the right side air inlet, and the vertical spacing between the top plenum surface and the bottom plenum surface at the left side air inlet or at the right side air inlet is greater than a vertical spacing between the top plenum surface and the bottom plenum surface at a midpoint of the bottom air plenum.

In at least one embodiment, the top plenum surface of the bottom air plenum is configured to support a food rack.

The features, functions, and advantages can be achieved independently in various embodiments of the present invention or may be combined in yet other embodiments in which further details can be seen with reference to the following description and drawings.

BRIEF DESCRIPTION OF THE DRAWINGS

The following detailed description, given by way of example and not intended to limit the present invention solely thereto, will best be understood in conjunction with the accompanying drawings in which.

DETAILED DESCRIPTION OF THE EXEMPLARY EMBODIMENTS

In the present disclosure, like reference numbers refer to like elements throughout the drawings, which illustrate various exemplary embodiments of the present invention.

Figure 1:
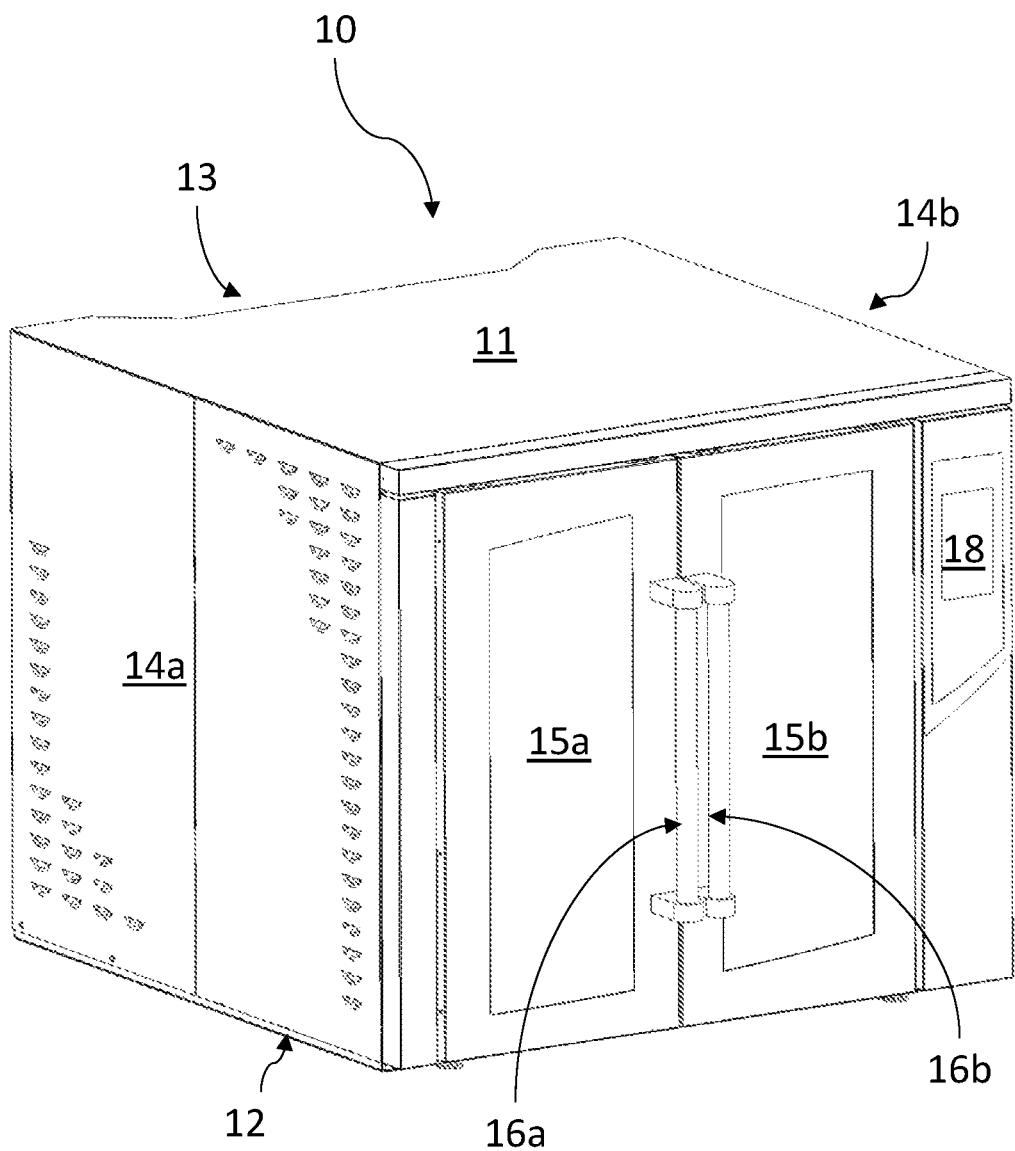
FIG. 1 is an isometric view of a convection oven, in accordance with an exemplary embodiment of the present invention.

Referring now to the drawings and in particular to FIG. 1, there is depicted an isometric view of a convection oven, in accordance with an exemplary embodiment of the present invention. As shown, a convection oven 10 includes a housing having a top panel 11, a bottom panel 12, a rear panel 13 and two side panels 14a, 14b.

A pair of oven doors 15a, 15b may form the front panel of the housing and are pivotally connected with side panels 14a, 14b, respectively, via hinges. Oven doors 15a and 15b may include handles 16a and 16b, respectively, for opening and closing the same, and a latch may be provided to keep doors 15a, 15b in a closed position. Door sensing switches (not shown) may be used to sense when oven doors 15a, 15b are being opened or closed.

In alternative embodiments, instead of a pair of oven doors, the oven may include a single oven door (not shown) which is pivotally connected with one of side panels 14a, 14b, top panel 11, or bottom panel 12 via hinges, or one or more bottom hinged doors (also not shown).

Convection oven 10 also includes a control panel 18, which may be implemented with one or more control knobs, one or more touchscreens, or a combination of a control knob and touchscreen technology. An operator can enter commands or cooking parameters, such as cooking temperature, cooking time, fan speed, etc., via control panel 18 to effectuate cooking controls on any food items placed within convection oven 10.

With reference now to FIGS. 2A-2B and 3A-3D, there are depicted various views of an oven cavity 20 within convection oven 10, in accordance with an exemplary embodiment of the present invention.

Figure 2A:
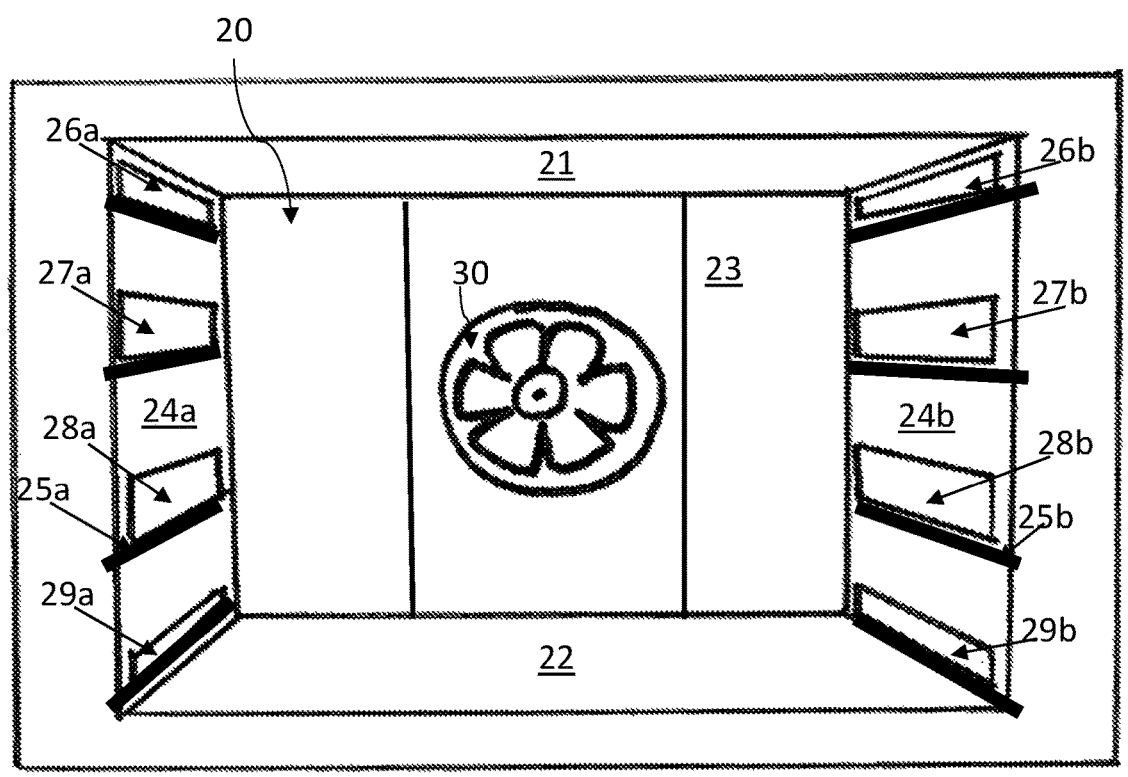
FIG. 2A is a front perspective view of an oven cavity of the convection oven from FIG. 1, with no air plenum placed therein, in accordance with an exemplary embodiment of the present invention.

FIG. 2A provides a front perspective view of oven cavity 20 that has no air plenum placed therein. Oven cavity 20 is defined by a top cavity wall 21, a bottom cavity wall 22, a back cavity wall 23, and left and right side cavity walls 24a and 24b, along with oven doors 15a, 15b (shown in FIG. 1). The size of oven cavity 20 for an oven designed for the "full sized" market may be about 10 cubic feet in accordance with an exemplary embodiment of the present invention. Different dimensions would apply for oven cavities in smaller or larger sized ovens. Located on both side cavity walls 24a, 24b are multiple parallel rails 25a, 25b configured to support placement of one or more air plenums within oven cavity 20.

Figure 3A:
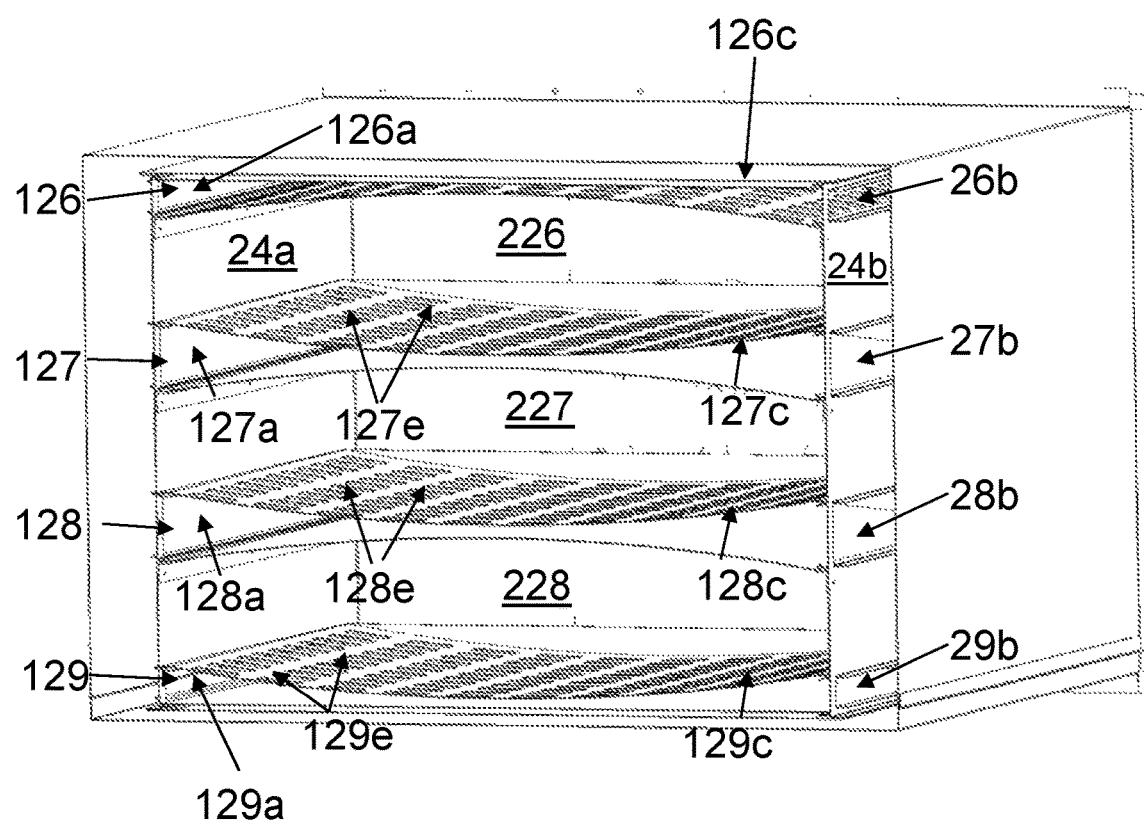
FIGS. 3A-3D are various cross-sectional views of an oven cavity populated with air plenums within the convection oven from FIG. 1, in accordance with an exemplary embodiment of the present invention.
Figure 3B:
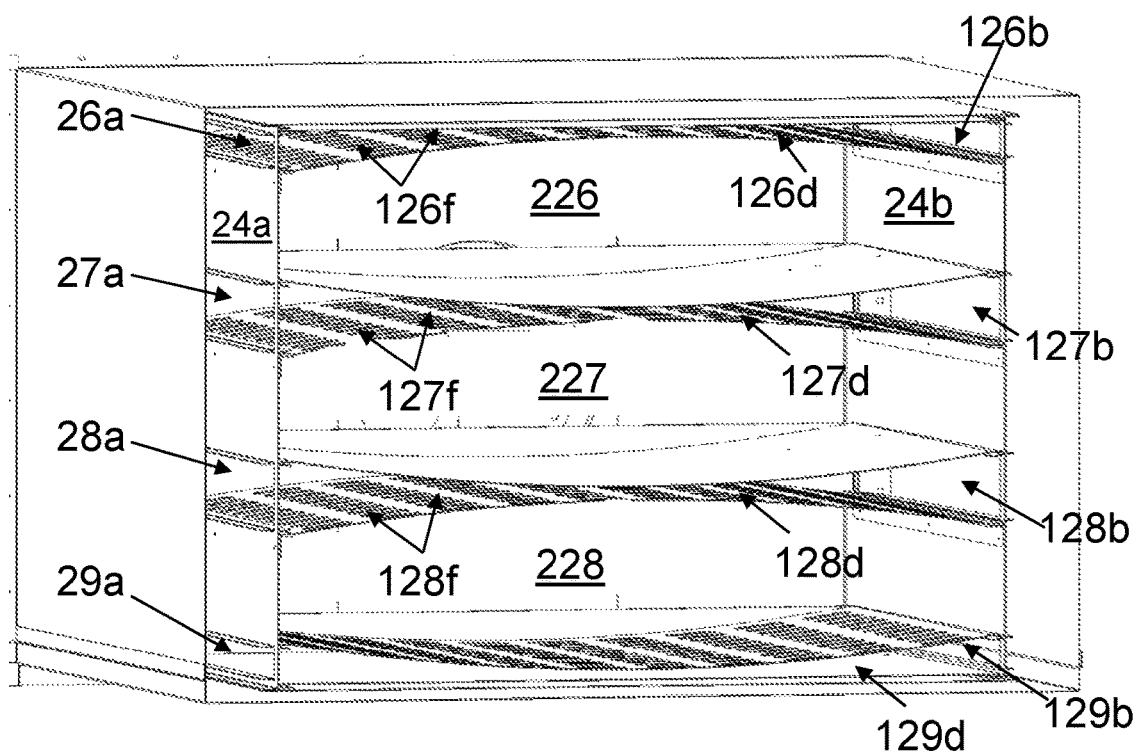

Also located on each of left and right side cavity walls 24a and 24b are one or more air channels for bringing heated air from one or more air blowers 19 (see, e.g., FIGS. 3D and 3E) within convection oven 10 into oven cavity 20. As shown in FIGS. 2A and 3A-3B, left side cavity wall 24a includes left side air channels 26a, 27a, 28a, 29a, which are placed in parallel and spaced vertically apart from each other. Likewise, right side cavity wall 24b includes right side air channels 26b, 27b, 28b, 29b, which are placed in parallel and spaced vertically apart from each other. Preferably, left side air channels 26a, 27a, 28a, 29a and right side air channels 26b, 27b, 28b, 29b are symmetrically placed on left and right side cavity walls 24a, 24b so that, as further described below, an air plenum placed within oven cavity 20 can receive heated air from a pair of left and right side air channels located at substantially the same vertical height (e.g., (26a, 26b), (27a, 27b), (28a, 28b), (29a, 29b)) through its left and right sides. Preferably, the size of each of left side air channels 26a, 27a, 28a, 29a is substantially the same as the size of its paired right side air channel 26b, 27b, 28b, 29b.

FIG. 2A shows that each of left and right side air channels 26a, 27a, 28a, 29a, 26b, 27b, 28b, 29b may comprise a single horizontally elongated rectangular opening. In alternative embodiments, each air channel may take various other shape or form, such as a plurality of rectangular or circular openings, or openings of other shapes.

Figure 3C:
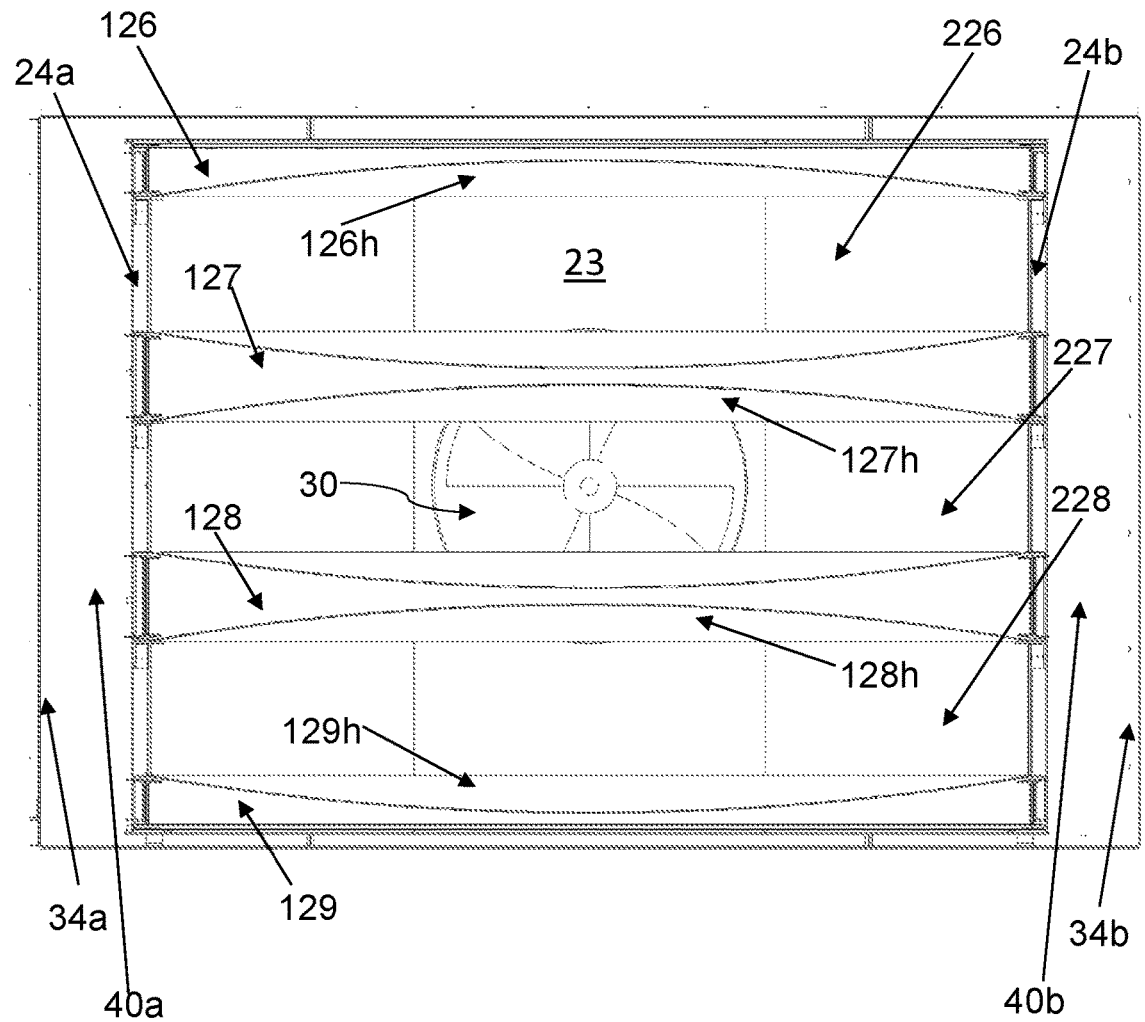
Figure 3D:
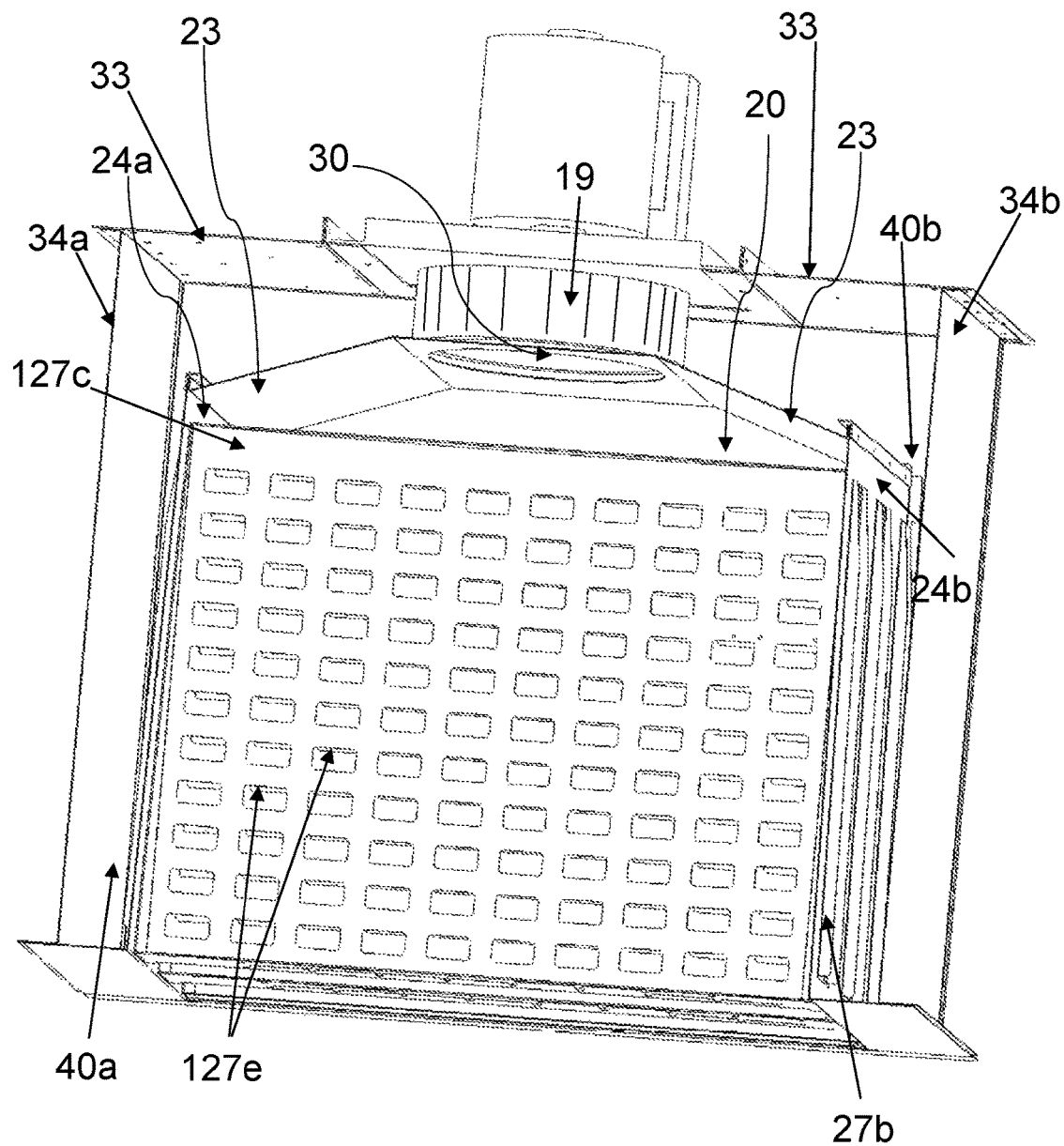

FIG. 2A also shows a return air opening 30 located on back cavity wall 23 of oven cavity 20 (see also FIG. 3D).

Figure 2B:
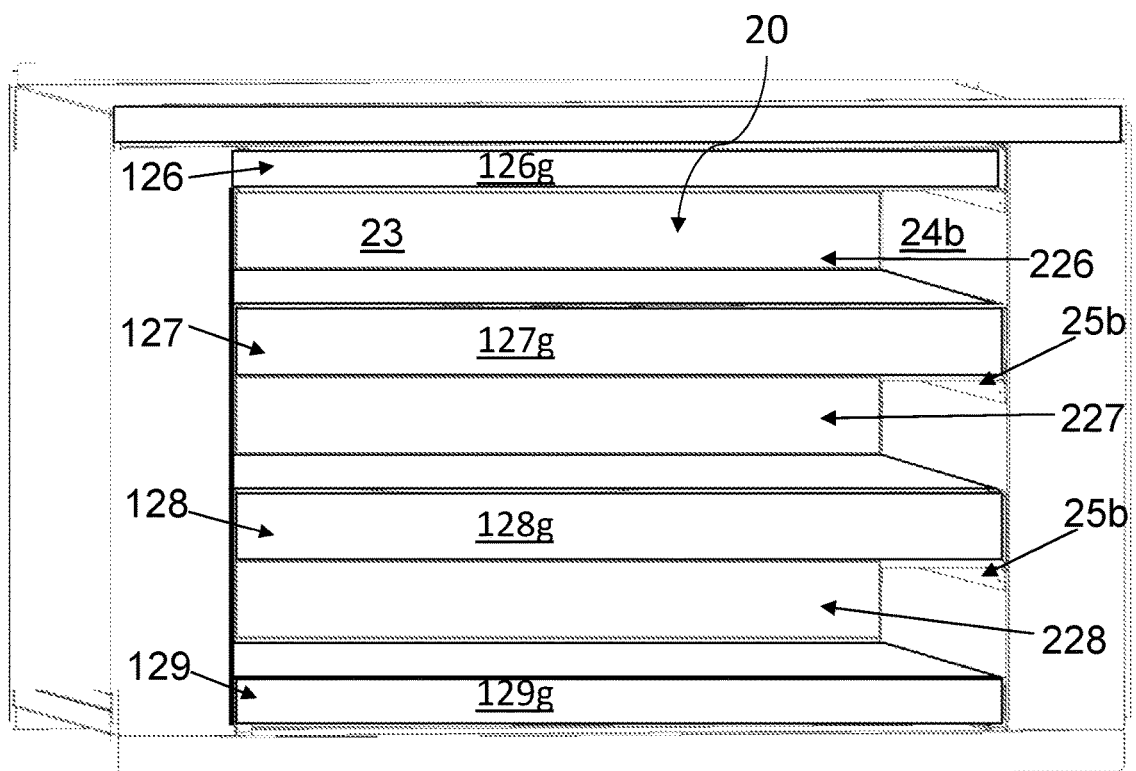
FIG. 2B is a front isometric view of the oven cavity from FIG. 2A, populated with air plenums in accordance with an exemplary embodiment of the present invention.

Referring now to FIGS. 2B and 3A-3C, oven cavity 20 may be populated with one or more air plenums. FIG. 2B provides a front isometric view of oven cavity 20 populated with a top air plenum 126, a bottom air plenum 129, and one or more intermediate air plenums 127, 128. FIGS. 3A-3C provide front cross-sectional views of air plenums 126, 127, 128, 129 placed in oven cavity 20. FIGS. 3A-3B also provide partial views of right side air channels 26b, 27b, 28b, 29b in right side cavity wall 24b and partial views of left side air channels 26a, 27a, 28a, 29a in left side cavity wall 24a of oven cavity 20.

As shown in FIG. 2B, intermediate air plenums 127, 128 divide oven cavity 20 into multiple cooking chambers 226, 227, 228 (e.g., three in this case). Top air plenum 126 and intermediate air plenum 127 define the top and the bottom of cooking chamber 226, respectively; intermediate air plenum 127 and intermediate air plenum 128 define the top and the bottom of cooking chamber 227, respectively; and intermediate air plenum 128 and bottom air plenum 129 define the top and the bottom of cooking chamber 228, respectively. The size of at least one of these cooking chambers 226, 227, 228 for an oven designed for the "full sized" market may range between 1.5 and 2.0 cubic feet in accordance with an exemplary embodiment of the present invention. Different dimensions would apply for cooking chambers in smaller or larger sized ovens.

Each of air plenums 126, 127, 128, 129 comprises a front surface 126g, 127g, 128g, 129g (see FIG. 2B), a rear surface 126h, 127h, 128h, 129h (see FIG. 3C) a top plenum surface 126c, 127c, 128c, 129c (see FIG. 3A), a bottom plenum surface 126d, 127d, 128d, 129d (see FIG. 3B), a left side having a left side air inlet 126a, 127a, 128a, 129a (see FIG. 3A), and a right side having a right side air inlet 126b, 127b, 128b, 129b (see FIG. 3B), all of which define exterior surface and interior space of the air plenum. Preferably, the front and rear surfaces of each air plenum 126, 127, 128, 129 are substantially air impermeable so as to permit no air flow through them.

When each of air plenums 126, 127, 128, 129 is placed within oven cavity 20, front surface 126g, 127g, 128g, 129g of air plenum 126, 127, 128, 129 faces oven doors 15a, 15b; and rear surface 126h, 127h, 128h, 129h faces back cavity wall 23 of oven cavity 20.

As shown in FIGS. 2B and 3A-3C, intermediate air plenums 127, 128 may be substantially identical to each other in structure. In alternative embodiments, each of intermediate air plenums may be configured differently in structure.

As shown in FIGS. 3A-3B, left side air inlet 126a of top air plenum 126 is connected or placed adjacent to left side air channel 26a located on left side cavity wall 24a of oven cavity 20 and right side air inlet 126b of top air plenum 126 is connected or placed adjacent to right side air channel 26b located on right side cavity wall 24b of oven cavity 20, so that heated air flowing from left and right side air channels 26a, 26b can enter the interior space of top air plenum 126 through left and right side air inlets 126a, 126b, respectively.

As also shown in FIGS. 3A-3B, left side air inlet 127a of intermediate air plenum 127 is connected or placed adjacent to left side air channel 27a located on left side cavity wall 24a of oven cavity 20 and right side air inlet 127b of intermediate air plenum 127 is connected or placed adjacent to right side air channel 27b located on right side cavity wall 24b of oven cavity 20, so that heated air flowing from left and right side air channels 27a, 27b can enter the interior space of intermediate air plenum 127 through left and right side air inlets 127a, 127b, respectively. Likewise, left side air inlet 128a of intermediate air plenum 128 is connected or place adjacent to left side air channel 28a located on left side cavity wall 24a of oven cavity 20 and right side air inlet 128b of intermediate air plenum 128 is connected or placed adjacent to right side air channel 28b located on right side cavity wall 24b of oven cavity 20, so that heated air flowing from left and right side air channels 28a, 28b can enter the interior space of intermediate air plenum 128 through left and right side air inlets 128a, 128b, respectively.

As also shown in FIGS. 3A-3B, left side air inlet 129a of bottom air plenum 129 is connected or placed adjacent to left side air channel 29a located on left side cavity wall 24a of oven cavity 20 and right side air inlet 129b of bottom air plenum 129 is connected or placed adjacent to right side air channel 29b located on right side cavity wall 24b of oven cavity 20, so that heated air flowing from left and right side air channels 29a, 29b can enter the interior space of bottom air plenum 129 through left and right side air inlets 129a, 129b, respectively.

Each of air plenums 126, 127, 128, 129 may be removable from oven cavity 20. In that case, left and right side air inlets 126a, 126b of top air plenum 126 are removably connected to left and right side air channels 26a, 26b, respectively; left and right side air inlets 127a, 127b of intermediate air plenum 127 are removably connected to left and right side air channels 27a, 27b, respectively; left and right side air inlets 128a, 128b of intermediate air plenum 128 are removably connected to left and right side air channels 28a, 28b, respectively; and left and right side air inlets 129a, 129b of bottom air plenum 129 are removably connected to left and right side air channels 29a, 29b, respectively. In addition, each of left and right side air channels 26a, 27a, 28a, 29a, 26b, 27b, 28b, 29b may be coverable by a flap (not shown) if the corresponding air plenum is removed from oven cavity 20 and is no longer connected to the air channel.

In alternative embodiments, some or all of air plenums 126, 127, 128, 129 may be permanently fixed to oven cavity 20. In that case, left and right side air inlets 126a, 126b of top air plenum 126 may be removably or permanently connected to left and right side air channels 26a, 26b, respectively; left and right side air inlets 127a, 127b of intermediate air plenum 127 may be removably or permanently connected to left and right side air channels 27a, 27b, respectively; left and right side air inlets 128a, 128b of intermediate air plenum 128 may be removably or permanently connected to left and right side air channels 28a, 28b, respectively; and left and right side air inlets 129a, 129b of bottom air plenum 129 may be removably or permanently connected to left and right side air channels 29a, 29b, respectively. For example, top and bottom air plenums 126, 129 may be permanently fixed to oven cavity 20, while intermediate air plenums 127, 128 may be removable from oven cavity 20.

If intermediate air plenums 127, 128 are removable from oven cavity 20, the number and the size of cooking chambers within oven cavity 20 can be changed or adjusted by removing one or more intermediate air plenums from oven cavity 20. For example, by removing intermediate air plenum 128, oven cavity 20 has a relatively large cooking chamber on the bottom (with the combined space for cooking chambers 227 and 228) and a smaller cooking chamber 226.

As shown in FIGS. 3A-3B, the size and shape of each of left side air inlets 126a, 127a, 128a, 129a of air plenums 126, 127, 128, 129 may substantially match the size and shape of the corresponding left side air channel 26a, 27a, 28a, 29a from which the left side air inlet receives heated air. Likewise, the size and shape of each of right side air inlets 126b, 127b, 128b, 129b may substantially match the size and shape of the corresponding right side air channel 26b, 27b, 28b, 29b from which the right side air inlet receives heated air.

In alternative embodiments, the size of each of left and right side air inlets of the air plenums may be smaller or larger than the size of the air channel from which the air inlet receives heated air. In further alternative embodiments, the shape of each of left and right air inlets of the air plenums may be different from the shape of the air channel from which the air inlet receives heated air. For example, an air channel on the side cavity wall of oven cavity 20 may comprise a plurality of circular openings, while the corresponding air inlet of an air plenum may be in the shape of an elongated rectangular opening.

As shown in FIGS. 3A-3C, air plenums 126, 127, 128, 129 may be placed relative to left and right side cavity walls 24a, 24b within oven cavity 20 in such a way that heated air coming from left side air channels 26a, 27a, 28a, 29a, and right side air channels 26b, 27b, 28b, 29b cannot flow into oven cavity 20 except through air plenums 126, 127, 128, 129.

In alternative embodiments, left and right side cavity walls 24a and 24b of oven cavity 20 may include additional separate openings (not shown) to allow additional air flow into oven cavity 20 from the left and right sides.

As shown in FIGS. 3A-3B, each intermediate air plenum 127, 128 may be configured to direct heated air both upwards and downwards. Top plenum surface 127c of intermediate air plenum 127 has a plurality of top air outlets 127e that are configured to direct a portion of heated air received from left and right side air channels 27a, 27b through left and right side air inlets 127a, 127b upwards into cooking chamber 226. Bottom plenum surface 127d of intermediate air plenum 127 has a plurality of bottom air outlets 127f that are configured to direct a portion of heated air received from left and right side air channels 27a, 27b through left and right side air inlets 127a, 127b downwards into cooking chamber 227.

Likewise, top plenum surface 128c of intermediate air plenum 128 has a plurality of top air outlets 128e that are configured to direct a portion of heated air received from left and right side air channels 28a, 28b through left and right side air inlets 128a, 128b upwards into cooking chamber 227. Bottom plenum surface 128d of intermediate air plenum 128 has a plurality of bottom air outlets 128f that are configured to direct a portion of heated air received from left and right side air channels 28a, 28b through left and right side air inlets 128a, 128b downwards into cooking chamber 228.

On the other hand, top air plenum 126 and bottom air plenum 129 are configured to direct heated air in only one direction—upwards or downwards. Bottom plenum surface 126d of top air plenum 126 has a plurality of bottom air outlets 126f that are configured to direct heated air received from left and right side air channels 26a, 26b through left and right side air inlets 126a, 126b downwards into cooking chamber 226. Top plenum surface 129c of bottom air plenum 129 has a plurality of top air outlets 129e that are configured to direct heated air received from left and right side air channels 29a, 29b through left and right side air inlets 129a, 129b upwards into cooking chamber 228.

With reference now to FIG. 3D, there is depicted a top cross-sectional view of oven cavity 20, exposing top plenum surface 127c and top air outlets 127e of intermediate air plenum 127. FIG. 3D shows an exemplary supply air path in which a supply air exits an air blower 19 and flows through both a left supply channel 40a and a right supply channel 40b to reach the air channels (e.g., right side air channel 27b) located on left and right side cavity walls 24a, 24b of oven cavity 20. As shown in FIGS. 3C-3D, a back channel wall 33 and left and right side channel walls 34a, 34b of convection oven 10 surround oven cavity 20. Left supply channel 40a is defined by the portions of back channel wall 33 and back cavity wall 23 located to the left of air blower 19, left side channel wall 34a, and left side cavity wall 24a. Right supply channel 40b is defined by the portions of back channel wall 33 and back cavity wall 23 located to the right of air blower 19, right side channel wall 34b, and right side cavity wall 24b.

FIG. 3D also shows an exemplary return air path from oven cavity 20 to air blower 19 via return air opening 30 located on back cavity wall 23 of oven cavity 20.

Figure 3E:
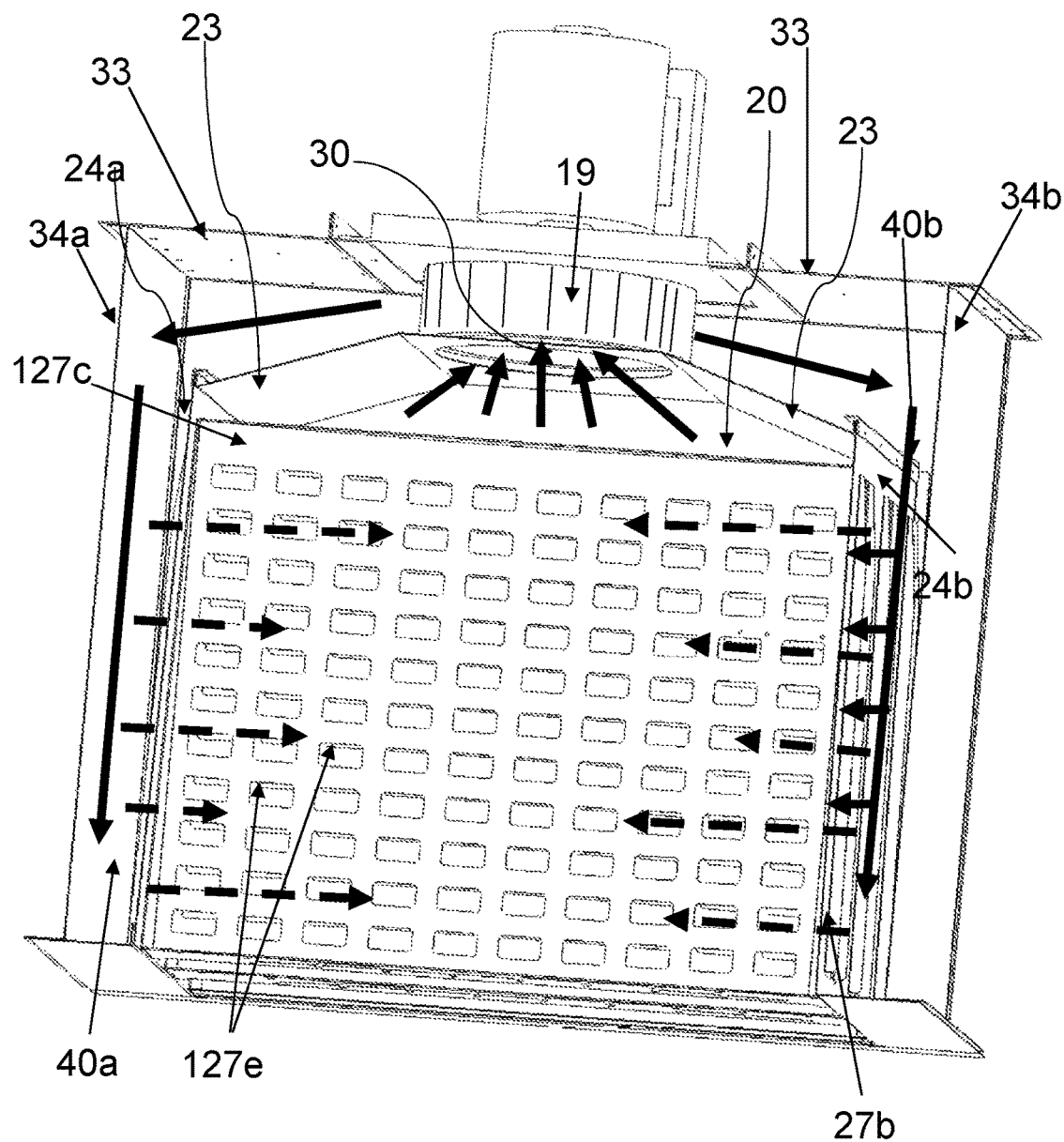
FIGS. 3E-3F illustrate exemplary directions of air flow within the oven cavity of the convection oven from FIG. 1.
Figure 3F:
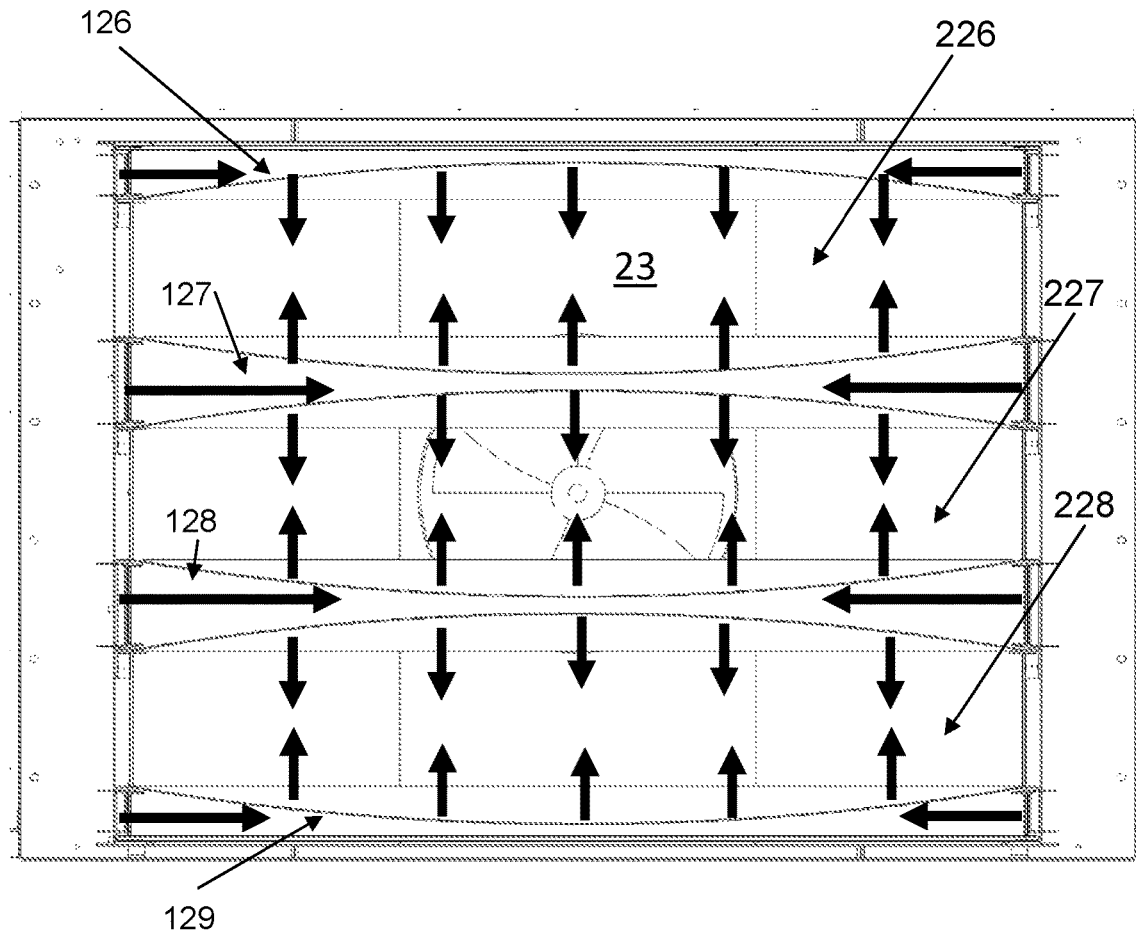

FIGS. 3E-3F illustrate directions of air flow (indicated by arrows) when convection oven 10 of FIGS. 3A-3D is in operation in accordance with an exemplary embodiment of the present invention. As shown in FIG. 3E, one or more air blowers 19 in convection oven 10 send heated air to both left and right supply channels 40a and 40b and the heated air reaches left and right side air channels 26a, 27a, 28a, 29a, 26b, 27b, 28b, 29b located on left and right side cavity walls 24a, 24b of oven cavity 20. The heated air then enters the interior space of air plenums 126, 127, 128, 129 via left and right side air channels 26a, 27a, 28a, 29a, 26b, 27b, 28b, 29b.

Referring now to FIG. 3F, top air plenum 126 receives the heated air from left and right side air channels 26a, 26b through left and right side air inlets 126a, 126b, and then direct the heated air downwards into cooking chamber 226 via bottom air outlets 126f in bottom plenum surface 126d.

Intermediate air plenum 127 receives the heated air from left and right side air channels 27a, 27b through left and right side air inlets 127a, 127b, and then (1) direct a portion of the heated air upwards into cooking chamber 226 via top air outlets 127e in top plenum surface 127c and (2) direct a portion of the heated air downwards into cooking chamber 227 via bottom air outlets 127f in bottom plenum surface 127d.

Intermediate air plenum 128 receives the heated air from left and right side air channels 28a, 28b through left and right side air inlets 128a, 128b, and then (1) direct a portion of the heated air upwards into cooking chamber 227 via top air outlets 128e in top plenum surface 128c and (2) direct a portion of the heated air downwards into cooking chamber 228 via bottom air outlets 128f in bottom plenum surface 128d.

Bottom air plenum 129 receives the heated air from left and right side air channels 29a, 29b through left and right side air inlets 129a, 129b, and then direct the heated air upwards into cooking chamber 228 via top air outlets 129e in top plenum surface 129c.

In this way, the heated air changes its direction from a generally horizontal path to a generally vertical path as it passes through air plenums 126, 127, 128, 129 and enters cooking chambers 226, 227, 228 within oven cavity 20, as illustrated in FIG. 3F.

Referring now to FIG. 3E, the air in oven cavity 20 may be returned to the air blower 19 via return air opening 30 located on back cavity wall 23 of oven cavity 20.

Preferably, the interior space of each of air plenums 126, 127, 128, 129 is shaped in a way that facilitates even distribution of heated air flowing into oven cavity 20. For example, as shown in FIGS. 3A-3C, top plenum surface 127c, 128c and bottom plenum surface 127d, 128d of intermediate air plenum 127, 128 that respectively define the top and the bottom of the interior space of the intermediate air plenum may be shaped in a way that optimizes even distribution of heated air flow into oven cavity 20. Likewise, bottom plenum surface 126d of top air plenum 126 and top plenum surface 129c of bottom air plenum 129 may be shaped in a way that optimizes even distribution of heated air flow into oven cavity 20.

In accordance with an exemplary embodiment shown in FIGS. 3A-3C, each of top plenum surface 127c, 128c and bottom plenum surface 127d, 128d of intermediate air plenum 127, 128, bottom plenum surface 126d of top air plenum 126, and top plenum surface 129c of bottom air plenum 129 may be curved so that (1) a vertical spacing between top plenum surface 126c, 127c, 128c, 129c and the bottom plenum surface 126d, 127d, 128d, 129d at left side air inlet 126a, 127a, 128a, 129a of each air plenum 126, 127, 128, 129 is substantially equal to a vertical spacing between top plenum surface 126c, 127c, 128c, 129c and the bottom plenum surface 126d, 127d, 128d, 129d at right side air inlet 126b, 127b, 128b, 129b; and (2) the vertical spacing between top plenum surface 126c, 127c, 128c, 129c and the bottom plenum surface 126d, 127d, 128d, 129d at left side air inlet 126a, 127a, 128a, 129a is greater than a vertical spacing between top plenum surface 126c, 127c, 128c, 129c and the bottom plenum surface 126d, 127d, 128d, 129d at a midpoint of the air plenum 126, 127, 128, 129.

For example, as shown in FIGS. 3A-3C (and also in FIG. 4D), top plenum surface 127c, 128c and bottom plenum surface 127d, 128d of intermediate air plenum 127, 128 may be shaped so that their front cross-section comprises two substantially hyperbolic curves, which are curved toward each other at a midpoint of the intermediate air plenum.

Figure 4A:
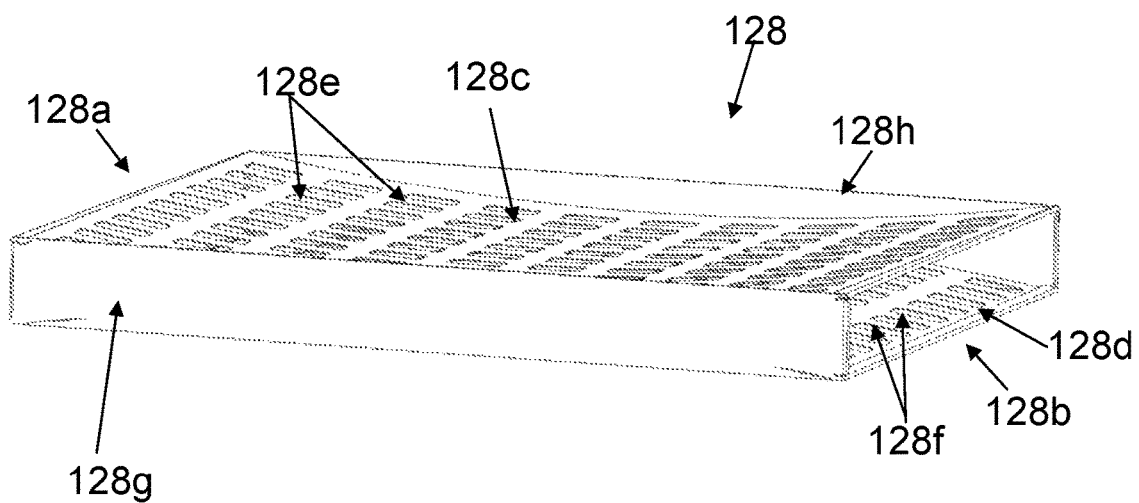
FIGS. 4A-4D are front isometric, top planar, side isometric, and front cross-sectional views of an intermediate air plenum, respectively, in accordance with an exemplary embodiment of the present invention.

Referring now to FIGS. 4A-4D, there are depicted various views of intermediate air plenum 128 in accordance with an exemplary embodiment of the present invention. FIG. 4A is a front isometric view of intermediate air plenum 128 comprising substantially air impermeable front and rear surfaces 128g, 128h, top plenum surface 128c having a plurality of top air outlets 128e, bottom plenum surface 128d having a plurality of bottom air outlets 128f, left side air inlet 128a, and right side air inlet 128b.

Figure 4B:
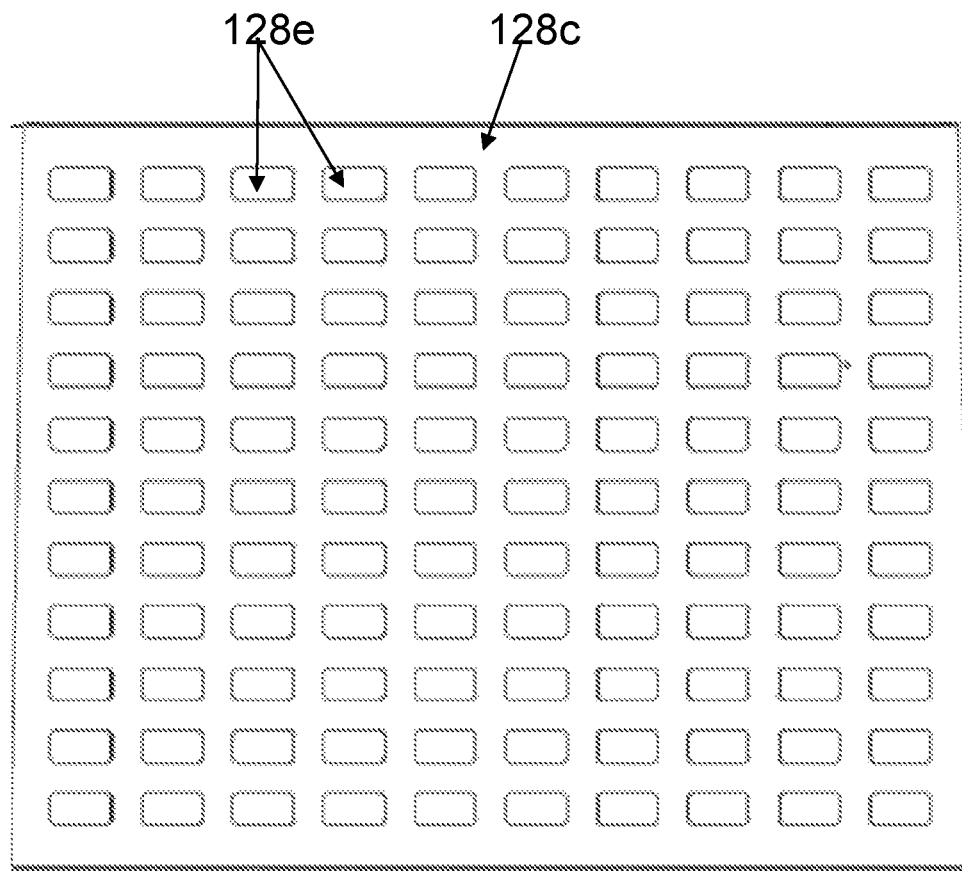

FIG. 4B is a top planar view of intermediate air plenum 128 showing top plenum surface 128c having a plurality of top air outlets 128e. Preferably, bottom plenum surface 128d of intermediate air plenum 128 has substantially the same structure as top plenum surface 128c. In that case, FIG. 4B can be a bottom planar view of intermediate air plenum 128 showing bottom plenum surface 128d having a plurality of bottom air outlets 128f. As an example, the size of each top air outlet 128e (or bottom air outlet 128f) may range between 1.25 and 2.5 square inches. While each of top air outlets 128e (or bottom air outlets 128f) shown in FIG. 4B has a substantially rectangular shape, it may have a different shape in alternative embodiments, such as square, circle, ellipse, rhombus, trapezoid, hexagon, or other type of regular or irregular geometric shape.

Figure 4C:
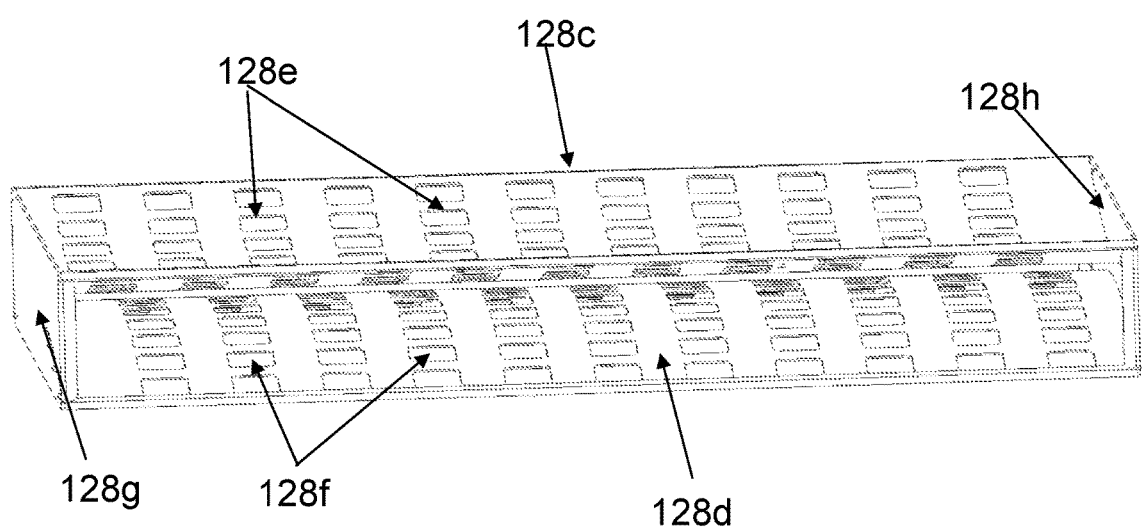

FIG. 4C is a side isometric view of intermediate air plenum 128, looking into right side air inlet 128b. Top plenum surface 128c and bottom plenum surface 128d are curved toward each other at the midpoint of intermediate air plenum 128, and top air outlets 128e and bottom air outlets 128f are partially visible. As shown in FIG. 4C, the arrangements of top air outlets 128e and bottom air outlets 128f may be offset from each other so that air changing its direction from horizontal to upwards can push off from the solid surface of bottom plenum surface 128d and likewise air changing its direction from horizontal to downwards can push off from the solid surface of top plenum surface 128c. If the arrangements of top air outlets 128e and bottom air outlets 128f are aligned with each other, air moving upwards through top air outlets 128e would be pushing off from air moving downwards through bottom air outlets 128f. By offsetting the arrangements of top air outlets 128e and bottom air outlets 128f of intermediate air plenum 128, increased air velocity can be achieved, which would result in reduced cook times.

Figure 4D:
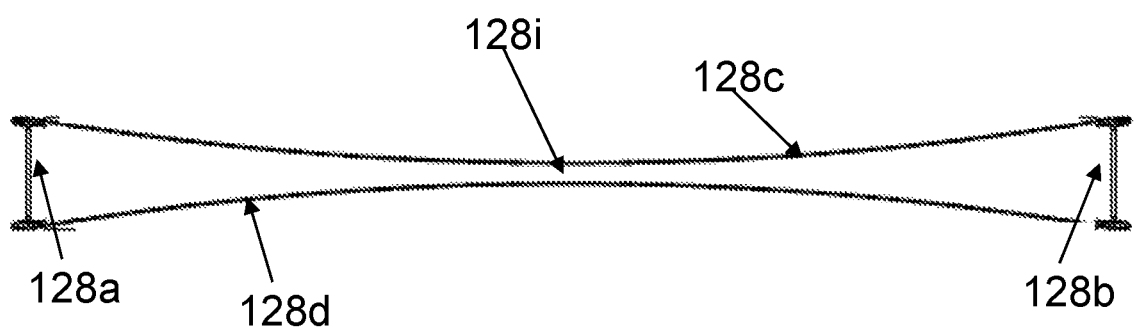

FIG. 4D is a front cross-sectional view of intermediate air plenum 128, showing the cross section of top plenum surface 128c and bottom plenum surface 128d forming two substantially hyperbolic curves, curving toward each other at a midpoint 1281 of intermediate air plenum 128. This configuration optimizes even distribution of heated air flow into the oven cavity by forcing the heated air received through left and right side air inlets 128a, 128b into the increasingly narrower interior space as it approaches midpoint 1281 of intermediate air plenum 128.

In accordance with an exemplary embodiment of the present invention, the front and rear width of intermediate air plenum 128 for an oven designed for the "full sized" market may range between 20 inches and 30 inches (e.g., 26.8 inches). The right and left side length of intermediate air plenum 128 (e.g., horizontal width of left/right side air inlet 128a, 128b) for an oven designed for the "full sized" market may range between 15 inches and 25 inches (e.g., 21 inches). Different dimensions would apply for the front and rear width and the right and left side length of intermediate air plenum in smaller or larger sized ovens.

In addition, the vertical spacing between top plenum surface 128c and bottom plenum surface 128d of intermediate air plenum 128 at left side air inlet 128a and at right side air inlet 128b (e.g., vertical height of left/right side air inlet 128a, 128b) for an oven designed for the "full sized" market may range between 1.5 inches and 3 inches (e.g., 2 inches), and the vertical spacing between top plenum surface 128c and bottom plenum surface 128d at midpoint 1281 of intermediate air plenum 128 for such an oven may range between 0.25 inches and 1.25 inches (e.g., 0.7 inches). Different dimensions would apply for the vertical spacing between top plenum surface and bottom plenum surface of intermediate air plenum in smaller or larger sized ovens.

As has been described, the present invention provides an improved convection oven providing a more uniform flow of heated air within the oven cavity.

While this invention has been described in conjunction with exemplary embodiments outlined above and illustrated in the drawings, it is evident that many alternatives, modifications and variations in form and detail will be apparent to those skilled in the art. Accordingly, the exemplary embodiments of the invention, as set forth above, are intended to be illustrative, not limiting, and the spirit and scope of the present invention is to be construed broadly and limited only by the appended claims, and not by the foregoing specification.

What is claimed is:

1. A convection oven comprising:
   a housing having an oven cavity and an oven door for access to the oven cavity;
   at least one air channel located on a first cavity wall of the oven cavity;
   an air blower for sending heated air to the at least one air channel; and
   a shelf assembly separating the oven cavity into an upper, intermediate, and lower cooking chamber, the shelf assembly comprising:
      at least one inlet configured to receive a portion of the heated air from the at least one air channel;
      a bottom plenum surface defining a bottom of the upper cooking chamber and including a plurality of upper air outlets, the upper air outlets being configured to direct a portion of the heated air received through the at least one air inlet through a first lateral pathway and upwards into the upper cooking chamber;
      a top plenum surface defining a top of the intermediate cooking chamber and including a plurality of lower air outlets, the lower air outlets being configured to direct a portion of the heated air received through the at least one air inlet through the first lateral pathway and downwards into the intermediate cooking chamber;
      a bottom plenum surface defining a bottom of the intermediate cooking chamber and including a plurality of upper air outlets, the upper air outlets being configured to direct a portion of the heated air received through the at least one air inlet through a second lateral pathway air conduit and upwards into the intermediate cooking chamber;
      a top plenum surface defining a top of the lower cooking chamber and including a plurality of lower air outlets, the lower air outlets being configured to direct a portion of the heated air received through the at least one air inlet through the second lateral pathway and downwards into the upper cooking chamber;
      wherein the first and second lateral pathways decrease in cross-section as the heated air moves away from the at least one air inlets;
      wherein the first and second and second lateral pathways have a curved wall to provide decreasing cross section wherein the cross section decreases at a decreasing rate as the heated air moves away from the at least one air inlet.

2. The convection oven of claim 1, wherein the upper air outlets and the lower air outlets of intermediate cooking chamber are offset.

3. The convection oven of claim 1, wherein the shelf assembly further comprises:
a front surface; and
a rear surface,
wherein each of the front surface and the rear surface is substantially air impermeable.

4. The convection oven of claim 1, wherein at least one of the top plenum surface and the bottom plenum surface of each of the upper cooking chamber and the lower cooking chamber is curved.

5. The convection oven of claim 1, wherein the top plenum surface and the bottom plenum surface of the intermediate cooking chamber are both curved away from each other such that a vertical spacing between the top plenum surface and the bottom plenum surface of the intermediate cooking chamber at the at least one air inlet is substantially equal to a vertical spacing between the top plenum surface and the bottom plenum surface of the intermediate cooking chamber at an end opposite the at least one inlet, and the vertical spacing between the top plenum surface and the bottom plenum surface of the intermediate cooking chamber at the at least one air inlet is less than a vertical spacing between the top plenum surface and the bottom plenum surface at a horizontal midpoint of the top and bottom plenum surface.

6. The convection oven of claim 5, wherein a front cross-section of the top plenum surface and the bottom plenum surface of the intermediate cooking chamber of the shelf assembly comprises two substantially hyperbolic curves.

7. The convection oven of claim 6, wherein the shelf assembly is removable from the oven cavity.

8. The convection oven of claim 5, wherein the vertical spacing between the top plenum surface of the lower cooking chamber and an upper wall defining the second lateral pathway and the vertical spacing between the bottom plenum surface of the upper cooking chamber and a lower wall defining the first lateral pathway at the at least one air inlet is between 1.5 inches and 3.0 inches and the vertical spacing between the top plenum surface of the lower cooking chamber and the upper wall defining the second lateral pathway and the vertical spacing between the bottom plenum surface of the upper cooking chamber and the lower wall defining the first lateral pathway air conduit at the horizontal midpoint of the top and bottom plenum surface is between 0.25 inches and 1.25 inches.

9. The convection oven of claim 1, wherein each of front and rear widths of the shelf assembly is between 20 inches and 30 inches and each of left and right side lengths of the shelf assembly is between 15 inches and 25 inches.

10. The convection oven of claim 1, wherein:
the at least one air inlet is permanently connected to the at least one air channel.

11. The convection oven of claim 1, wherein:
the at least one air inlet is removably connected to the at least one air channel.

12. The convection oven of claim 11, wherein the at least one air channel is coverable by a flap if not connected to the at least one air inlet.

13. The convection oven of claim 1, wherein the shelf assembly is removable from the oven cavity.

14. The convection oven of claim 1, wherein the bottom plenum surface of the intermediate cooking chamber is configured to support a food rack for the interior cooking chamber.

15. The convection oven of claim 1, further comprising a return air opening located on a back cavity wall of the oven cavity.

16. The convection oven of claim 1, wherein a vertical spacing between the bottom plenum surface of the intermediate cooking chamber and a respective lower wall at the at least one air inlet is substantially equal to a vertical spacing between the bottom plenum surface of the intermediate cooking chamber and the lower wall at an end opposite the at least one inlet and the vertical spacing between the bottom plenum surface of the intermediate cooking chamber and the lower wall at the at least one air inlet is greater than a vertical spacing between the bottom plenum of the intermediate cooking chamber and the lower wall at a horizontal midpoint of the top and bottom plenum surface.

17. The convection oven of claim 1, wherein a vertical spacing between the top plenum surface of the intermediate cooking chamber and a respective upper wall at the at least one air inlet is substantially equal to a vertical spacing between the top plenum surface the intermediate cooking chamber and the upper wall at an end opposite the at least one inlet, and the vertical spacing between the top plenum surface of the intermediate cooking chamber and the upper wall at the at least one air inlet is greater than a vertical spacing between the top plenum surface of the intermediate cooking chamber and the upper wall at a horizontal midpoint of the bottom air plenum.

18. A convection oven comprising:
a housing having an oven cavity and an oven door for access to the oven cavity;
an air channel located on a cavity wall of the oven cavity;
an air blower for sending heated air to the air channel; and
an interior air plenum assembly defining upper and lower cooking chambers, the interior air plenum comprising:
an air inlet configured to receive a portion of the heated air from the air channel;
a top plenum surface defining the top of an upper cooking chamber and including a plurality of lower air outlets, the air outlets being configured to direct the heated air received through the air inlet and downwards into the upper cooking chamber;
a bottom plenum surface defining a bottom of the upper cooking chamber and including a plurality of upper air outlets, the upper air outlets being configured to direct a portion of the heated air received through the at least one air inlet through a lateral pathway and upwards into the upper cooking chamber; and
a top plenum surface defining a top of a lower cooking chamber and including a plurality of lower air outlets, the lower air outlets being configured to direct a portion of the heated air received through the air inlet through the lateral pathway and downwards into the lower cooking chamber;
a bottom plenum surface defining a bottom of the lower cooking chamber and including a plurality of upper air outlets, the upper air outlets being configured to direct a portion of the heated air received through the air inlet and upwards into the lower cooking chamber;
wherein the lateral pathway has a curved wall to provide decreasing cross section as the heated air moves away from the air inlet;
wherein the cross section decreases at a decreasing rate as the heated air moves away from the air inlet.

\* \* \* \* \*